US012596188B2

(12) United States Patent
Nam et al.

(10) Patent No.: US 12,596,188 B2
(45) Date of Patent: Apr. 7, 2026

(54) POSITIONING METHOD USING MULTIPLE DEVICES AND ELECTRONIC DEVICE THEREFOR

(71) Applicant: SAMSUNG ELECTRONICS CO., LTD., Suwon-si (KR)

(72) Inventors: Janghyun Nam, Suwon-si (KR); Hyoseok Na, Suwon-si (KR); Taesik Yun, Suwon-si (KR); Gupil Cheong, Suwon-si (KR); Juyeon Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 18/124,300

(22) Filed: Mar. 21, 2023

(65) Prior Publication Data

US 2023/0221430 A1     Jul. 13, 2023

Related U.S. Application Data

(63) Continuation of application No. PCT/KR2021/013109, filed on Sep. 27, 2021.

(30) Foreign Application Priority Data

Sep. 28, 2020     (KR) ........................ 10-2020-0126003

(51) Int. Cl.
*G01S 13/87*          (2006.01)
*G01S 13/82*          (2006.01)
(Continued)

(52) U.S. Cl.
CPC .......... *G01S 13/878* (2013.01); *G01S 13/825* (2013.01); *G01S 13/84* (2013.01); *H04R 1/1041* (2013.01);
(Continued)

(58) Field of Classification Search
CPC ...... G01S 13/878; G01S 13/825; G01S 13/84; H04W 4/80; H04R 1/1016; H04R 2420/07
See application file for complete search history.

(56) References Cited

U.S. PATENT DOCUMENTS 8,326,228 B2     12/2012  Lewis et al.
8,928,529 B2     1/2015   Kee
(Continued)

FOREIGN PATENT DOCUMENTS

CN          110582052 A      12/2019
CN          111405508        7/2020
(Continued)

OTHER PUBLICATIONS

Extended Search Report dated Feb. 16, 2024 in European Patent Application No. 21872973.9.
(Continued)

*Primary Examiner* — Ayodeji O Ayotunde
(74) *Attorney, Agent, or Firm* — Nixon & Vanderhye, P.C.

(57)          ABSTRACT

An example wireless audio electronic device includes a first antenna, a communication circuit, and a processor. The processor may be configured to receive a positioning signal from an external electronic device through the first antenna so as to obtain first positioning information; obtain, from a different audio device located in a case together with the wireless audio electronic device, second positioning information for the positioning signal received by the different wireless audio electronic device; determine an angle of arrival of the positioning signal based on the first positioning information, the second positioning information, and the distance between the wireless audio electronic device and the different wireless audio electronic device; and transmit a (Continued)

response signal including information of the angle of arrival to the external electronic device.

12 Claims, 16 Drawing Sheets

(51) Int. Cl.
| | | |
|---|---|---|
| *G01S 13/84* | (2006.01) | |
| *H04R 1/10* | (2006.01) | |
| *H04W 4/80* | (2018.01) | |

(52) U.S. Cl.
CPC ............. *H04W 4/80* (2018.02); *H04R 1/1016* (2013.01); *H04R 2420/07* (2013.01); *H04R 2460/07* (2013.01)

(56) References Cited

U.S. PATENT DOCUMENTS

| | | | |
|---|---|---|---|
| 9,769,558 | B2 | 9/2017 | Chandramohan et al. |
| 9,980,189 | B2 | 5/2018 | Belverato |
| 10,070,212 | B2 | 9/2018 | Watson et al. |
| 10,142,778 | B2 | 11/2018 | Banerjea |
| 10,206,194 | B1 | 2/2019 | Haartsen |
| 10,219,062 | B2 | 2/2019 | Watson et al. |
| 10,324,162 | B2 | 6/2019 | Morioka |
| 10,349,259 | B2 | 7/2019 | Watson et al. |
| 10,681,668 | B2 | 6/2020 | Haartsen |
| 10,746,846 | B2 | 8/2020 | Morioka |
| 10,834,567 | B2 | 11/2020 | Watson et al. |
| 10,917,930 | B2 | 2/2021 | Morris et al. |
| 10,921,438 | B2 | 2/2021 | Jeon et al. |
| 11,064,408 | B2 | 7/2021 | Belverato |
| 2010/0159833 | A1 | 6/2010 | Lewis et al. |
| 2012/0257508 | A1* | 10/2012 | Reunamaki ............. H04W 4/80 |
| | | | 370/241 |
| 2017/0111834 | A1 | 4/2017 | Belverato |
| 2017/0123037 | A1 | 5/2017 | Kim et al. |
| 2017/0201859 | A1 | 7/2017 | Banerjea |
| 2018/0091898 | A1 | 3/2018 | Yoon et al. |
| 2018/0091965 | A1* | 3/2018 | Watson ................ H04R 1/1016 |
| 2018/0242212 | A1 | 8/2018 | Belverato |
| 2018/0376233 | A1 | 12/2018 | Watson et al. |
| 2019/0072661 | A1 | 3/2019 | Jeon et al. |
| 2019/0277943 | A1 | 9/2019 | Morioka |
| 2019/0281437 | A1 | 9/2019 | Watson et al. |
| 2019/0327778 | A1 | 10/2019 | Morris et al. |
| 2019/0335264 | A1 | 10/2019 | Watson et al. |
| 2020/0103486 | A1* | 4/2020 | Knaappila ................ H04R 3/12 |
| 2020/0333141 | A1* | 10/2020 | Zhu ........................ G01S 5/0268 |
| 2021/0235528 | A1 | 7/2021 | Morris et al. |
| 2021/0337446 | A1 | 10/2021 | Belverato |

FOREIGN PATENT DOCUMENTS

| | | |
|---|---|---|
| KR | 100979623 B1 | 9/2010 |
| KR | 10-2016-0143572 | 12/2016 |
| KR | 10-2017-0052377 | 5/2017 |
| KR | 10-2019-0093956 | 8/2019 |
| KR | 10-2019-0120114 | 10/2019 |
| KR | 2086722 | 3/2020 |
| WO | 2016011433 A2 | 1/2016 |

OTHER PUBLICATIONS

International Search Report dated Jan. 24, 2022 in PCT/KR2021/013109.

Written Opinion dated Jan. 24, 2022 in PCT/KR2021/013109.

Office Action dated Dec. 31, 2024 in Indian Patent Application No. 202317022445 and English-language translation.

Hearing Notice dated Oct. 31, 2025 issued in Indian Patent Application No. IN 202317022445 and English-language translation.

Office Action issued Nov. 17, 2025 for Korean Patent Application No. KR 10-2020-0126003 and English-language translation.

Office Action issued Dec. 25, 2025 for Chinese Patent Application No. CN 202180066194.3 and English-language translation.

* cited by examiner

START

EXECUTE SPECIFIED APPLICATION ~1005

CONNECT TO WIRELESS AUDIO DEVICE ~1010

TRANSMIT POSITIONING SIGNAL
TO WIRELESS AUDIO DEVICE ~1015

RECEIVE RESPONSE SIGNAL
FROM WIRELESS AUDIO DEVICE ~1020

OUTPUT LOCATION OF WIRELESS AUDIO
DEVICE BASED ON RESPONSE SIGNAL ~1025

N    SPECIFIED CONDITION
SATISFIED? ~1030

Y

END

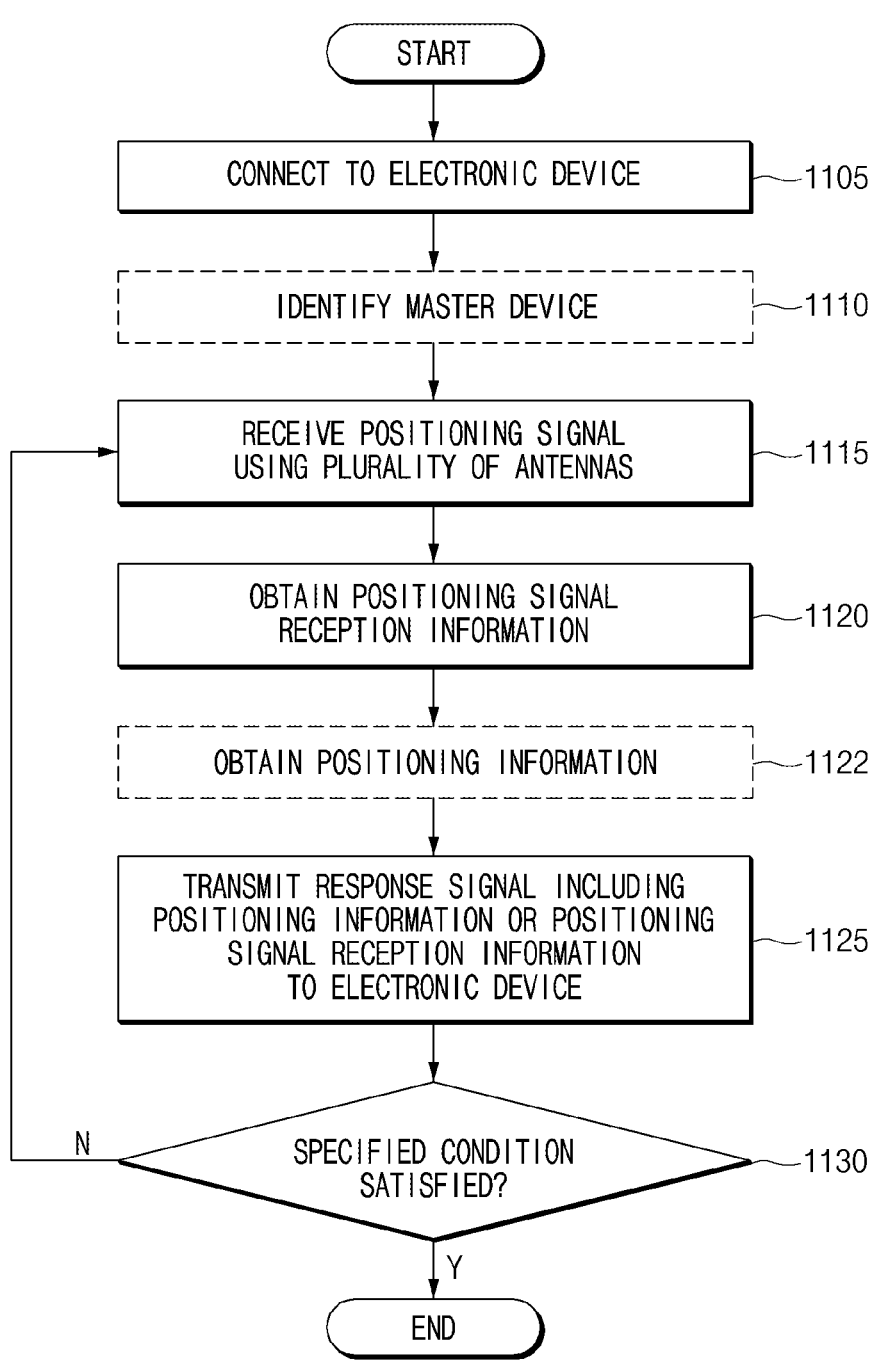
F I G . 11

1401

1501

1601

POSITIONING METHOD USING MULTIPLE DEVICES AND ELECTRONIC DEVICE THEREFOR

CROSS-REFERENCE TO RELATED APPLICATIONS

This application is a continuation of International Application No. PCT/KR2021/013109, designating the United States, filed on Sep. 27, 2021, in the Korean Intellectual Property Receiving Office and claiming priority to Korean Patent Application No. 10-2020-0126003, filed on Sep. 28, 2020 in the Korean Intellectual Property Office. The disclosures of each of these applications are incorporated by reference herein in their entireties.

FIELD

The disclosure relates to a positioning method using multiple devices and an electronic device therefor.

DESCRIPTION OF RELATED ART

A Bluetooth® technology standard stipulated by the Bluetooth Special Interest Group (SIG) defines a protocol for short range wireless communication between electronic devices. The Bluetooth protocol may include Bluetooth low energy (BLE) for reducing power consumption. In a Bluetooth network environment, electronic devices may transmit or receive data packets including content such as text, voice, image, or video through a specified frequency band (e.g., approximately 2.4 gigahertz (GHz)).

Methods for measuring a distance and direction based on Bluetooth communication have been proposed. For example, an electronic device may measure a distance between the electronic device and an external electronic device based on strength of a signal received from the external electronic device. Furthermore, the electronic device may measure an angle of arrival and/or an angle of departure by receiving a Bluetooth signal using a plurality of antennas.

SUMMARY

Various electronic devices may communicate based on a Bluetooth protocol. In particular, due to low power characteristics of the Bluetooth protocol, the Bluetooth protocol is widely used in data communication between small electronic devices. For example, when earphones (or earbuds, headset) are wirelessly connected to a smartphone, the earphone worn on the left ear of a user and the earphone worn on the right ear of the user may receive data packets transmitted from the smartphone. A small electronic device (e.g., earphones) may communicate with another electronic device using a single antenna due to limitation in cost, power consumption, or mounting space. In this case, distance measurement (e.g., based on signal strength) may be performed using a single antenna, but measurement of a direction may not be performed by the small electronic device. For example, a smartphone may measure an approximate distance to an earphone, but may be unable to determine direction of the earphone where the earphone is positioned.

Various example embodiments disclosed in the disclosure may provide an electronic device and a method for overcoming the above-described limitations in a Bluetooth network environment.

A first wireless audio device according to an example embodiment may include a first antenna, a communication circuit connected to the first antenna, and a processor connected to the communication circuit, wherein the processor may be configured to obtain first positioning information by receiving a positioning signal from an external electronic device via the first antenna, obtain, from a second wireless audio device located in a case together with the first wireless audio device, second positioning information for the positioning signal received by the second wireless audio device, determine an angle of arrival of the positioning signal based on the first positioning information, the second positioning information, and a distance between the first wireless audio device and the second wireless audio device, and transmit a response signal including information of the angle of arrival to the external electronic device.

A wireless audio device according to an example embodiment may include a first wireless audio device including a first antenna, a first communication circuit connected to the first antenna, and a first processor connected to the first communication circuit, the first wireless audio device being configured to obtain first positioning information by receiving a positioning signal from an external electronic device using the first antenna, a second wireless audio device including a second antenna, a second communication circuit connected to the second antenna, and a second processor connected to the second communication circuit, the second wireless audio device being configured to obtain second positioning information by receiving the positioning signal using the second antenna, and a case configured to accommodate the first wireless audio device and the second wireless audio device, wherein a master device among the first wireless audio device and the second wireless audio device may be configured to identify an angle of arrival of the positioning signal based on the first positioning information, the second positioning information, and a specified antenna distance, and transmit a response signal including information of the identified angle of arrival to the external electronic device, wherein the specified antenna distance may be based on a distance between the first antenna and the second antenna when the first wireless audio device and the second wireless audio device when disposed in the case.

A wireless audio device according to an example embodiment of the disclosure may include a first wireless audio device including a first antenna, a first communication circuit connected to the first antenna, and a first processor connected to the first communication circuit, a second wireless audio device including a second antenna, a second communication circuit connected to the second antenna, and a second processor connected to the second communication circuit, and a case including a third antenna, a third communication circuit connected to the third antenna, and a third processor connected to the third communication circuit, wherein a master device of one among the first wireless audio device, the second wireless audio device, and the case may be configured to receive a positioning signal from an external electronic device using two devices among the first wireless audio device, the second wireless audio device, and the case, obtain first positioning information and second positioning information based on the positioning signal received by each of the two devices, identify an angle of arrival of the positioning signal based on the first positioning information, the second positioning information, and a distance between antennas of the two devices, and transmit a response signal including information of the identified angle of arrival to the external electronic device.

According to various example embodiments of the disclosure, an electronic device may measure an angle of arrival using a pair of wireless audio devices.

Furthermore, according to various example embodiments of the disclosure, an electronic device may measure an angle of departure by receiving a signal from a plurality of wireless audio devices.

According to various example embodiments of the disclosure, a wireless audio device may measure a direction based on a distance between a pair of wireless audio devices when the pair of wireless audio devices are accommodated in a housing.

According to various embodiments of the disclosure, a wireless audio device may provide positioning without requiring an additional antenna by using antennas of a plurality of wireless devices as one antenna array.

In addition, various effects may be provided that are directly or indirectly identified through this disclosure.

BRIEF DESCRIPTION OF THE DRAWINGS

The above and/or other aspects of the disclosure will be more apparent by describing certain embodiments of the disclosure with reference to the accompanying drawings, in which:

FIG. 11 is a flowchart illustrating an example angle-of-arrival-based positioning method of an example wireless audio device according to various embodiments;

4

Figure 16:
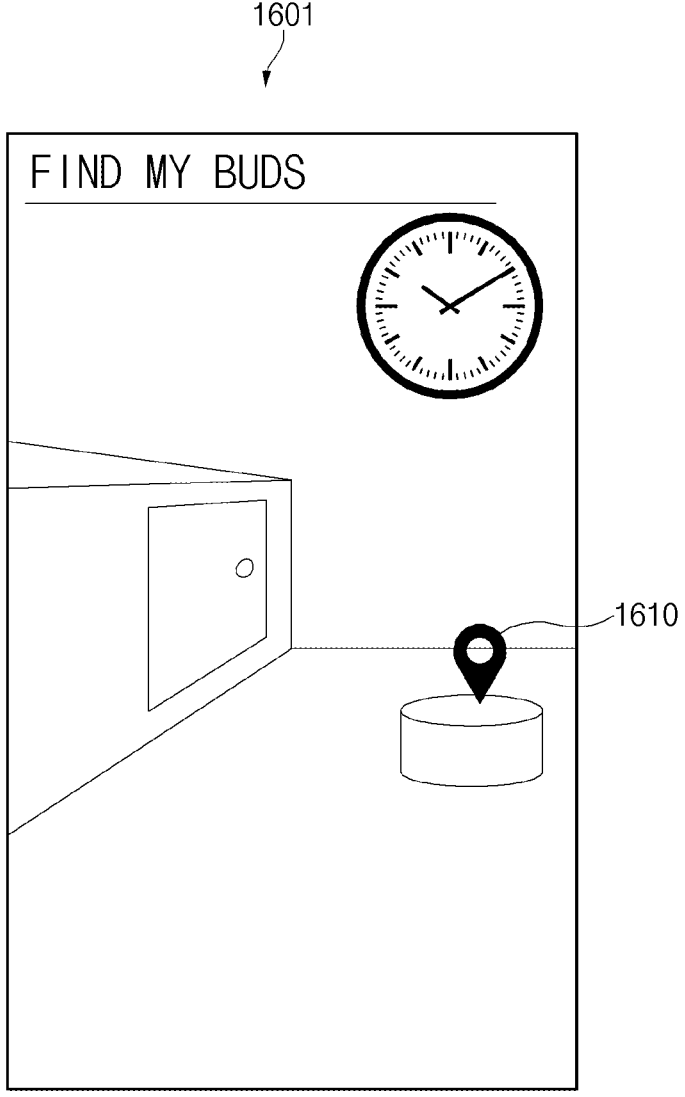

FIG. 16 is a diagram illustrating a third example user interface of an example electronic device according to various embodiments.

With respect to the description of the drawings, the same or similar reference signs or numerals may be used for the same or similar elements.

DETAILED DESCRIPTION

Hereinafter, various example embodiments will be described with reference to the accompanying drawings. However, it should be understood that the present disclosure is not limited to specific embodiments, but rather includes various modifications, equivalents and/or alternatives of various embodiments of the present disclosure.

Figure 1:
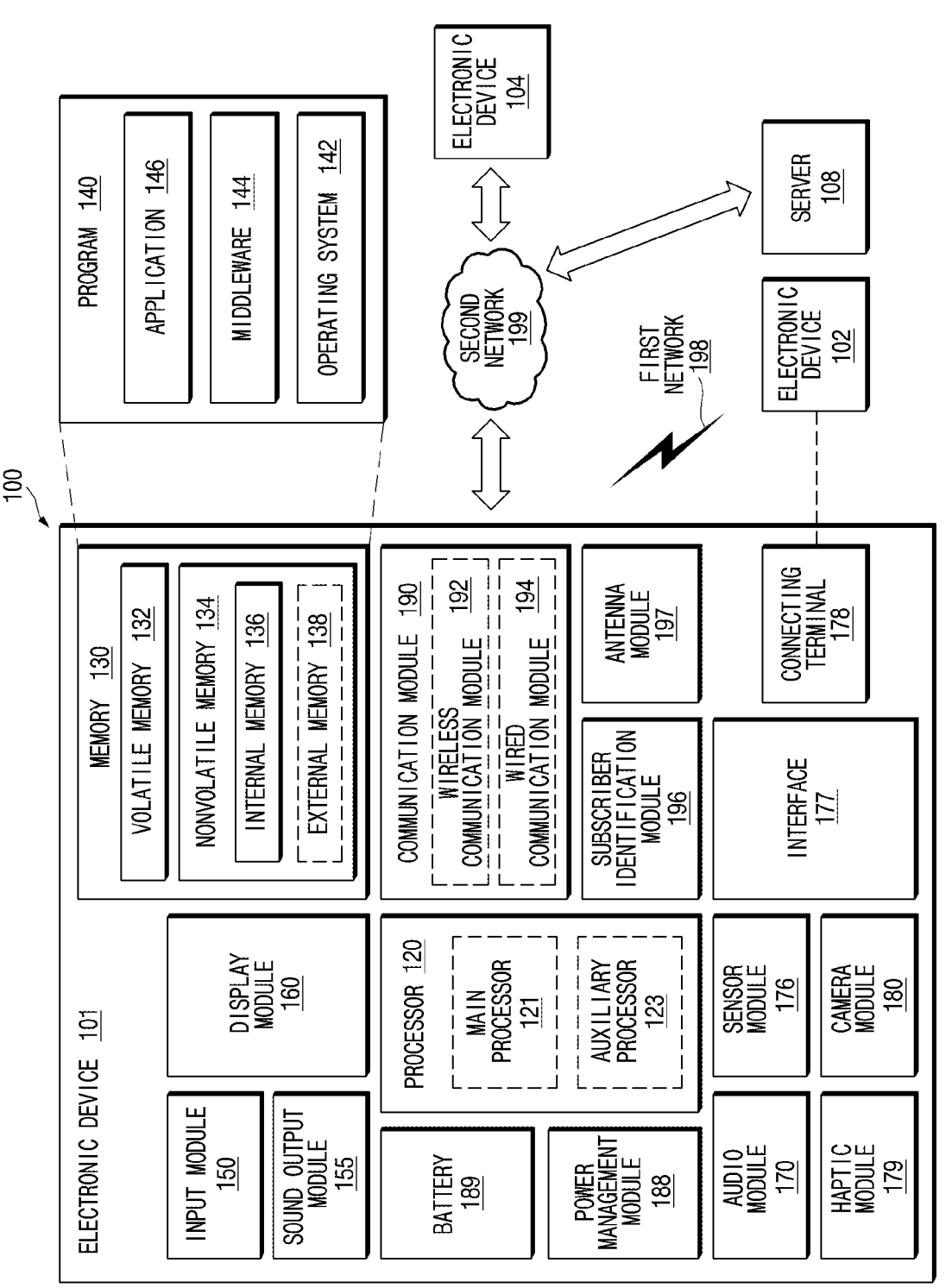
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1*ms* or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers, for example, to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
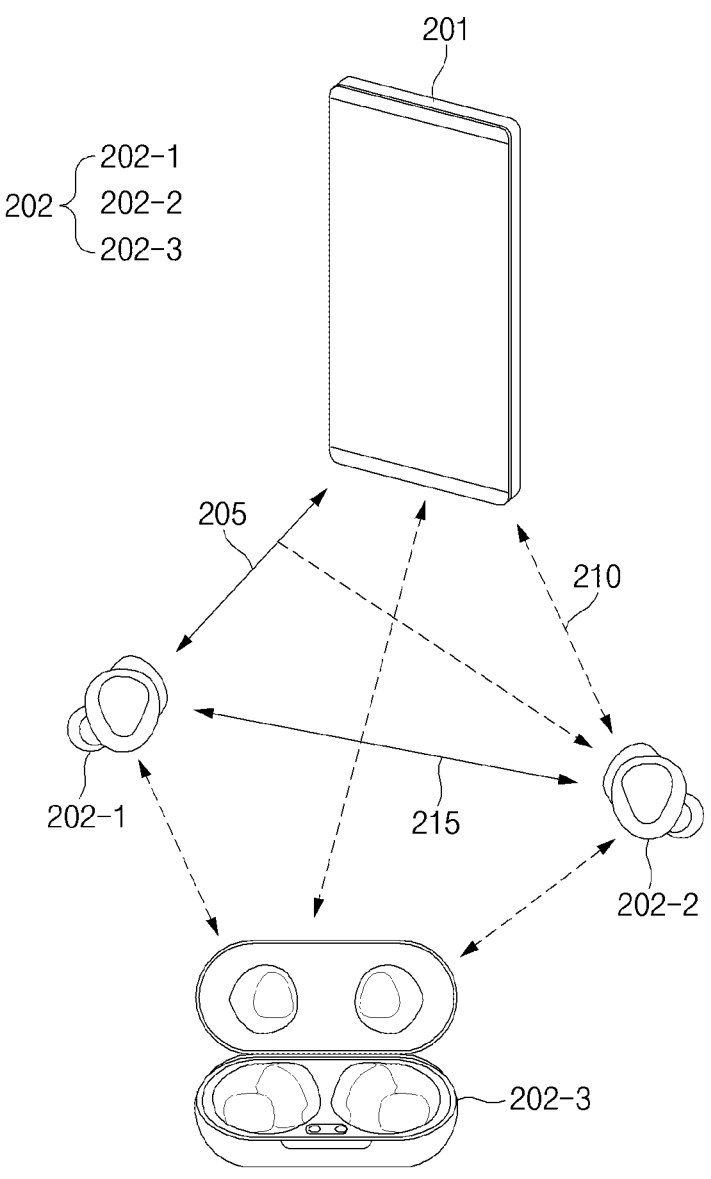
FIG. 2 is a diagram illustrating a topology of Bluetooth connection between an example electronic device and a wireless audio device according to various embodiments.

FIG. 2 is a diagram illustrating a topology of Bluetooth connection between an example electronic device and an example wireless audio device according to various embodiments.

Referring to FIG. 2, an electronic device 201 may be wirelessly connected to a wireless audio device 202 based on a Bluetooth protocol. The wireless audio device 202 may include a first wireless audio device 202-1, a second wireless audio device 202-2, and a case 202-3. The electronic device 201, the first wireless audio device 202-1, the second wireless audio device 202-2, and the case 202-3 may include components, at least some of which are the same as or similar to those of the electronic device 101 illustrated in FIG. 1, and may execute functions, at least some of which are the same as or similar to those of the electronic device 101. For example, the electronic device 201 and the wireless audio device 202 may perform wireless communication at a short range according to a Bluetooth network defined by Bluetooth Special Interest Group (SIG). The Bluetooth network may include, for example, a Bluetooth legacy network or a Bluetooth low energy (BLE) network. According to an embodiment, the electronic device 201 and the one or more devices 202-1, 202-2, and/or 202-3 may perform wireless communication via one or both of the Bluetooth legacy network and the BLE network. Hereinafter, the term "Bluetooth" may refer, for example, to any Bluetooth communication standard (e.g., at least one of Bluetooth legacy or BLE).

Although FIG. 2 illustrates the electronic device 201 as a smartphone, embodiments of the disclosure are not limited thereto. The electronic device 201 may include, for example, a user terminal such as a tablet PC, desktop computer, laptop computer, or the like. The electronic device 201 may support Bluetooth communication. For example, the electronic device 201 may include at least one communication circuit supporting Bluetooth communication and at least one antenna connected to the at least one communication circuit. When a communication circuit associated with Bluetooth communication of the electronic device 201 is connected to a plurality of antennas, at least one of the plurality of antennas may be selectively connected to another communication circuit associated with another communication standard.

In FIG. 2, the wireless audio device 202 may include at least one of an earbud, headset, wireless earphone, or earset. The shape and configuration of the wireless audio device 202 illustrated in FIG. 2 are examples, and embodiments of the disclosure are not limited thereto. The wireless audio device 202 of the disclosure may be any device including a set (e.g., pair) of wireless devices (e.g., the first wireless audio device 202-1 and the second wireless audio device 202-2) and a fixing device (e.g., accommodating structure) (e.g., the case 202-3) for physically fixing the set of wireless devices. For example, each wireless device of the set of wireless devices may include a communication circuit and one antenna connected to the communication circuit. When the set of wireless devices are fixed (e.g., accommodated) to the fixing device, the wireless devices may be spaced a specified distance apart. Hereinafter, the case 202-3 having a communication function is described as an example of the fixing device, but, in an embodiment, the case 202-3 may not have a communication function.

According to an embodiment, the one or more devices 202-1, 202-2, and/or 202-3 of FIG. 2 may recognize presence of another device (e.g., the first wireless audio device 202-1, the second wireless audio device 202-2, and/or the case 202-3) before connection or may store information (e.g., address information) about another device before connection. For example, the first wireless audio device 202-1 and the second wireless audio device 202-2 may recognize presence of each other before connection or may store address information of each other before connection.

According to an embodiment, the one or more devices 202-1, 202-2, and/or 202-3 each may support Bluetooth communication. For example, the one or more devices 202-1, 202-2, and/or 202-3 each may include a communication circuit for Bluetooth communication. Each communication circuit may be electrically connected to one antenna. In the following examples, it may be assumed that the one or more devices 202-1, 202-2, and/or 202-3 each includes only one antenna (e.g., antenna for Bluetooth communication) that may be used for positioning. For example, it may be assumed that an antenna (e.g., antenna for Bluetooth communication) that may be used for positioning is one, even in a case in which the one or more devices 202-1, 202-2, and/or 202-3 include a plurality of antennas.

According to an embodiment, the electronic device 201 may transmit a data packet including content such as positioning information, text, audio, image, or video to the one or more devices 202-1, 202-2, and/or 202-3. Not only the electronic device 201, but also the one or more devices 202-1, 202-2, and/or 202-3 may transmit a data packet according to the type of content included in a data packet. For example, if the electronic device 201 transmits a data packet for positioning, the one or more devices 202-1, 202-2, and/or 202-3 may obtain position information based on the data packet, and may transmit the obtained position information to the electronic device 201. For another example, if the electronic device 201 transmits information requesting transmission of a data packet for positioning, the one or more devices 202-1, 202-2, and/or 202-3 may transmit the data packet for positioning to the electronic device 201.

In an example, the electronic device 201 may communicate with the wireless audio device 202 via one wireless link. The electronic device 201 may generate a first link 205 with the first wireless audio device 202-1. The first wireless audio device 202-1, the second wireless audio device 202-2, and the case 202-3 may share information of the first link 205, and the second wireless audio device 202-2 and/or the case 202-3 may communicate with the electronic device 201 using a radio resource of the first link 205 based on the information of the first link 205. The information of the first link 205 may include address information (e.g., the Bluetooth address of the master device of the first link 205, the Bluetooth address of the electronic device 201, and/or the Bluetooth address of the first wireless audio device 202-1), piconet clock information (e.g. clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information.

In another example, the electronic device 201 may communicate with the wireless audio device 202 via a plurality of wireless links. The electronic device 201 may generate the first link 205 with the first wireless audio device 202-1 and a second link 210 with the second wireless audio device 202-2, and may communicate with the wireless audio device 202 via the first link 205 and the second link 210. In an example, the case 202-3 may communicate with the electronic device 201 via a separate link.

The electronic device 201 may be synchronized with the wireless audio device 202 based on clock information of a master device for at least one link between the electronic device 201 and the wireless audio device 202. For example, when the master device of the first link 205 is the electronic device 201, the first wireless audio device 202-1, the second wireless audio device 202-2, and/or the case 202-3 may be synchronized based on clock information of the electronic device 201.

According to an embodiment, the first wireless audio device 202-1 and the second wireless audio device 202-2 may communicate via a third link 215. For example, the first wireless audio device 202-1 and the second wireless audio device 202-2 may exchange data via the third link 215. In another example, the first wireless audio device 202-1 and the second wireless audio device 202-2 may exchange data by connecting to the case 202-3.

According to an embodiment, the case 202-3 may communicate with the first wireless audio device 202-1, the second wireless audio device 202-2, and/or the electronic device 201. The case 202-3 may communicate with the electronic device 201 using a radio resource of the first link 205 or using a separate link. The case 202-3 may communicate with the first audio device 202-1 and/or the second audio device 202-2 using a radio resource of the first link 205 or the third link 215 or using a separate link. For another example, the case 202-3 may communicate with the first wireless audio device 202-1 and/or the second wireless audio device 202-2 via a physical connector. The case 202-3 may include a connector (e.g., pin), which is electrically connected to the first wireless audio device 202-1 and/or the second wireless audio device 202-2 when the first wireless audio device 202-1 and/or the second wireless audio device 202-2 are inserted into the case 202-3. Although various communication methods of the case 202-3 have been described, in an embodiment, the case 202-3 may not support a communication function as described above.

Figure 3:
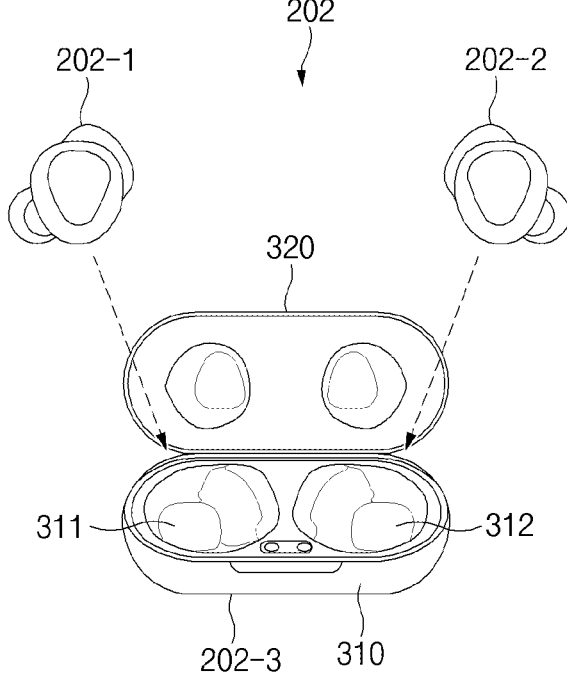
FIG. 3 is a diagram illustrating a configuration of an example wireless audio device according to various embodiments.

FIG. 3 is a diagram illustrating a configuration of an example wireless audio device according to various embodiments.

Referring to FIG. 3, the case 202-3 may be referred to as a housing, accommodation housing, cradle, charging dock, or the like. According to an embodiment, the case 202-3 may include a lower housing 310 and an upper housing 320. The upper housing 320 may be physically connected to the lower housing 310 and may be opened/closed with respect to the lower housing 310. The lower housing 310 may include a first accommodation space 311 for accommodating the first wireless audio device 202-1 and a second accommodation space 312 for accommodating the second wireless audio device 202-2. The second wireless audio device 202-2 may be fixed at a predetermined position with respect to the first wireless audio device 202-1. For example, the first wireless audio device 202-1 may be fixed within the lower housing 310 by the first accommodation space 311. The second wireless audio device 202-2 may be fixed within the lower housing 310 by the second accommodation space 312.

The first wireless audio device 202-1 and the second wireless audio device 202-2 may be physically fixed within the case when accommodated (disposed) in the case 202-3. In this case, distances between the first wireless audio device 202-1, the second wireless audio device 202-2, and the case 202-3 may be fixed.

According to an embodiment, the wireless audio device 202 may be used to measure an angle of arrival. For example, in order for the wireless audio device 202 to measure an angle of arrival of a signal received from the electronic device 201, the wireless audio device 202 is required to receive a signal using a plurality of antennas spaced a specified distance apart. The wireless audio device 202 may measure the angle of arrival based on a phase difference between signals received by the plurality of antennas and a distance between the antennas. In example embodiments of the disclosure, the first wireless audio device 202-1, the second wireless audio device 202-2, and/or the case 202-3 each may include at least one antenna. In an example embodiment, at least one of the first wireless audio device 202-1, the second wireless audio device 202-2, and/or the case 202-3 may have one antenna or have limited functionality and be unable to perform positioning alone. In this situation, the angle of arrival may be unable to be measured with only one of the first wireless audio device 202-1, the second wireless audio device 202-2, and the case 202-3. When first wireless audio device 202-1 and the second wireless audio device 202-2 are located within the case 202-3, a distance between antennas between each of the devices may be fixed to a specified length. The wireless audio device 202 may measure the angle of arrival by receiving a signal from the electronic device 201 using antennas of at least two of the first wireless audio device 202-1, the second wireless audio device 202-2, and the case 202-3. For example, when the wireless audio device 202 receives a signal using the first wireless audio device 202-1 and the second wireless audio device 202-2, the wireless audio device 202 may obtain the angle of arrival of a signal based on a distance (e.g., distance when accommodated in the case 202-3) between antennas of the first wireless audio device 202-1 and the second wireless audio device 202-2 and a phase difference between received signals.

According to an embodiment, the wireless audio device 202 may be used to measure an angle of arrival. For example, the wireless audio device 202 may receive a signal (e.g., mono pulse signal) from the electronic device 201 using antennas (e.g., first antenna and second antenna) of at least two of the first wireless audio device 202-1, the second wireless audio device 202-2, and the case 202-3. The wireless audio device 202 may receive a signal using a first channel in which a beam of a first antenna and a beam of a second antenna are added and a second channel in which the beam of the first antenna and the beam of the second antenna are subtracted. The wireless audio device 202 may obtain the angle of arrival by comparing signals received through the first channel and the second channel. In this case, the first antenna and the second antenna may be spaced apart by a specified distance for beamforming. In an example, the first accommodation space 311 and the second accommodation space 312 of the case 202-3 may be configured so that a distance between antennas thereof corresponds to the specified distance.

According to an embodiment, the wireless audio device 202 may be used to measure an angle of departure. For example, the wireless audio device 202 may transmit a plurality of signals using antennas (e.g., first antenna and second antenna) of at least two of the first wireless audio device 202-1, the second wireless audio device 202-2, and the case 202-3. The electronic device 202 may measure an angle of departure of the wireless audio device 202 by receiving a plurality of signals. For example, the electronic device 202 may measure the angle of departure based on a phase difference between the plurality of signals and a distance between the first antenna and the second antenna.

As described above, since the distances between the first wireless audio device 202-1, the second wireless audio device 202-2, and the case 202-3 are fixed, the wireless audio device 202 may provide measurement of an angle of arrival and/or angle of departure without requiring addition of a separate antenna. The methods for measuring an angle of arrival and/or angle of departure, concisely described with reference to FIG. 3, are illustrative and embodiments of the disclosure are not limited thereto. For example, a known signal direction measurement method using an antenna array including a plurality of antennas may be used in the positioning method of the disclosure. According to embodiments of the disclosure, the wireless audio device 202 may perform positioning using, as an antenna array, antennas of at least two of the first wireless audio device 202-1, the second wireless audio device 202-2, and the case 202-3.

In the following example embodiments, it may be assumed that the first wireless audio device 202-1 and the second wireless audio device 202-2 are accommodated in the case 202-3. Furthermore, it may be assumed that devices (e.g., the first wireless audio device 202-1, the second wireless audio device 202-2, and/or the case 202-3) used in positioning are synchronized based on the same clock (e.g., clock of a master device associated with a link between the electronic device 201 and the wireless audio device 202).

Figure 4:
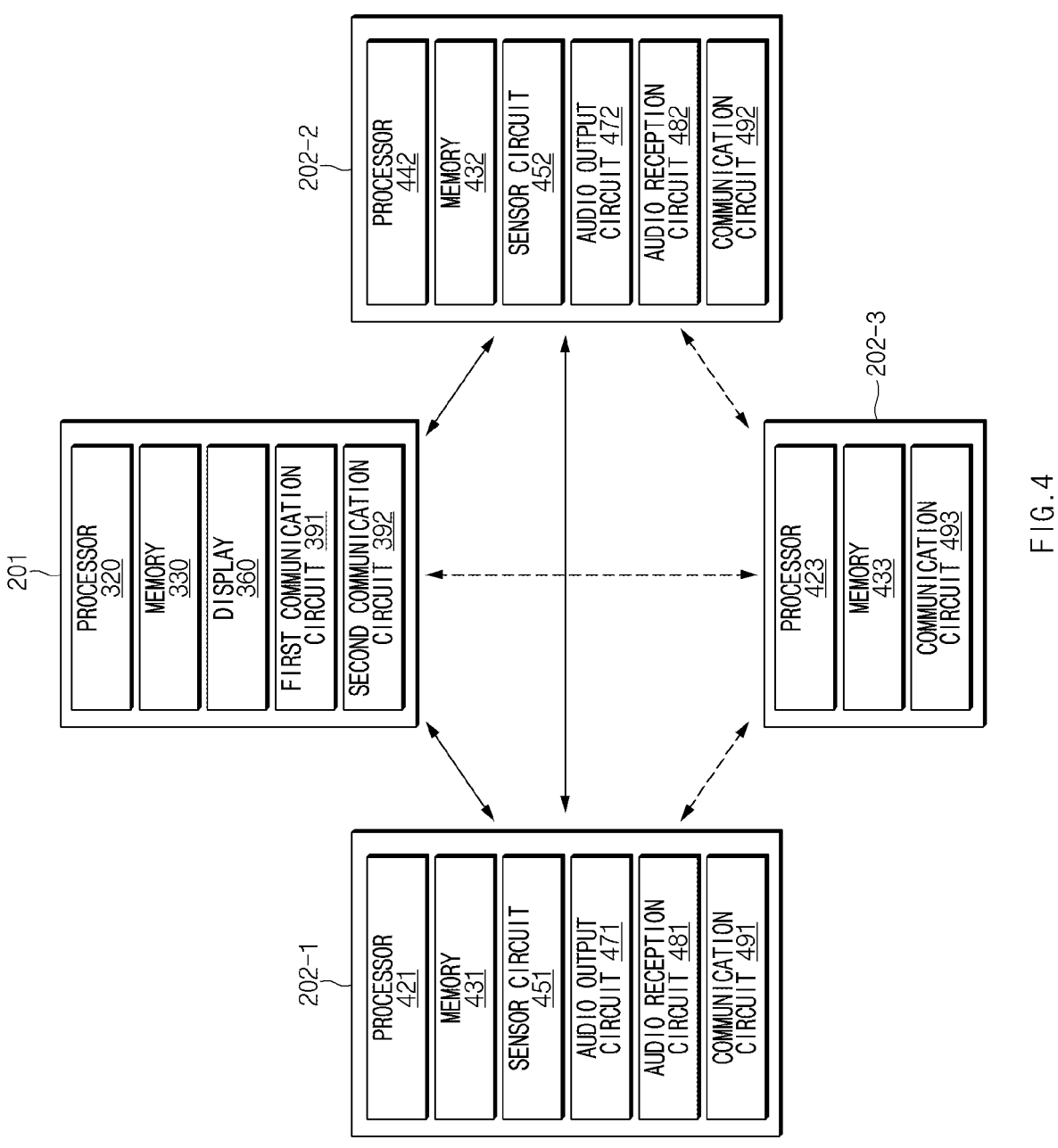
FIG. 4 is a block diagram illustrating electronic devices according to various embodiments.

FIG. 4 is a block diagram illustrating example electronic devices according to various embodiments.

According to an embodiment, various electronic devices (e.g., the electronic device 201, the first wireless audio device 202-1, and the second wireless audio device 202-2) disclosed in the disclosure may include at least some of the components of the electronic device (e.g., the electronic device 101 of FIG. 1) described above with reference to FIG. 1.

According to an embodiment, the electronic device 201 may include a processor 320 (e.g., the processor 120 of FIG. 1), a memory 330 (e.g., the memory 130 of FIG. 1), a display 360 (e.g., the display module 160 of FIG. 1), a first communication circuit 391 (e.g., the communication module 190 of FIG. 1), and/or a second communication circuit 392 (e.g., the communication module 190 of FIG. 1). The processor 320 may be operatively connected to the memory 330, the display 360, the first communication circuit 391, and the second communication circuit 392. The memory 330 may store one or more instructions that, when executed, cause the processor 320 to perform various operations of the electronic device 201. The second communication circuit 392 may be configured to support wireless communication based on a Bluetooth protocol (e.g., legacy Bluetooth and/or BLE). The first communication circuit 391 may be configured to support communication based on a wireless communication standard (e.g., cellular and/or WiFi) other than a Bluetooth protocol. The electronic device 201 may further include a configuration not illustrated in FIG. 4. For example, the electronic device 201 may further include an audio input/output device (e.g., the audio module 170 of FIG. 1) and/or a housing. The second communication circuit 392 may be operatively connected to at least one antenna. At least a portion of the at least one antenna connected to the second communication circuit 392 may be selectively connected to the first communication circuit 391 or the second communication circuit 392.

According to an embodiment, the first wireless audio device 202-1 may include a processor 421 (e.g., the processor 120 of FIG. 1), a memory 431 (e.g., the memory 130 of FIG. 1), a sensor circuit 451 (e.g., the sensor module 176 of FIG. 1), an audio output circuit 471 (e.g., the audio module 170 of FIG. 1), an audio reception circuit 481 (e.g., the audio module 170 of FIG. 1), and/or a communication circuit 491 (e.g., the communication module 190 of FIG. 1). The processor 421 (including, e.g., processing circuitry) may be operatively connected to the memory 431, the sensor circuit 451, the audio output circuit 471, the audio reception circuit 481, and the communication circuit 491. The sensor circuit 451 may sense information about a wearing state of the first device 202-1 and/or biometric information about a wearer. For example, the sensor circuit 451 may include a proximity sensor for sensing the wearing state and/or a heart rate sensor for sensing the biometric information. The audio output circuit 471 may be configured to output a sound. The audio reception circuit 481 may include one or more microphones. The memory 431 may store one or more instructions that, when executed, cause the processor 421 to perform various operations of the first wireless audio device 202-1. The communication circuit 481 may be configured to support wireless communication based on a Bluetooth protocol (e.g., legacy Bluetooth and/or BLE). The communication circuit 491 may be electrically connected to one antenna. The first wireless audio device 202-1 may further include a configuration not illustrated in FIG. 4. For example, the first wireless audio device 202-1 may further include an indicator (e.g., the display device 160 of FIG. 1), an audio input circuit (e.g., the audio module 170), an input interface (e.g., the interface 177 of FIG. 1), and/or a housing.

According to an embodiment, the second wireless audio device 202-2 may include a processor 442 (e.g., the processor 120 of FIG. 1), a memory 432 (e.g., the memory 130 of FIG. 1), a sensor circuit 452 (e.g., the sensor module 175 of FIG. 1), an audio output circuit 472 (e.g., the audio module 170 of FIG. 1), an audio reception circuit 482, and/or a communication circuit 492 (e.g., the communication module 190 of FIG. 1). The processor 442 (including, e.g., processing circuitry) may be operatively connected to the memory 432, the audio output circuit 472, the audio reception circuit 482, and the communication circuit 492. The sensor circuit 452 may sense information about a wearing state of the first device 202-1 and/or biometric information about a wearer. For example, the sensor circuit 452 may include a proximity sensor for sensing the wearing state and/or a heart rate sensor for sensing the biometric information. The audio output circuit 472 may be configured to output a sound. The memory 432 may store one or more instructions that, when executed, cause the processor 442 to perform various operations of the second device 202-2. The communication circuit 482 may be configured to support wireless communication based on a Bluetooth protocol (e.g., legacy Bluetooth and/or BLE). The communication circuit 492 may be electrically connected to one antenna. The second wireless audio device 202-2 may further include a configuration not illustrated in FIG. 4. For example, the second device 202-2 may further include an indicator (e.g., the display device 160 of FIG. 1), an audio input circuit (e.g., the audio module 170), an input interface (e.g., the interface 177 of FIG. 1), and/or a housing.

According to an embodiment, the case 202-3 may include a processor 423 (e.g., the processor 120 of FIG. 1), a memory 433 (e.g., the memory 130 of FIG. 1), and/or communication circuit 493 (e.g., the communication module 190 of FIG. 1). The processor 423 (including, e.g., processing circuitry) may be operatively connected to the memory 433 and the communication circuit 493. The memory 433 may store one or more instructions that, when executed, cause the processor 423 to perform various operations of the case 202-3. The communication circuit 493 may be configured to support wireless communication based on a Bluetooth protocol (e.g., legacy Bluetooth and/or BLE). The communication circuit 493 may be electrically connected to one antenna. In a situation in which the case 202-3 does not support wireless communication, the communication circuit 493 may be omitted.

According to an embodiment, the first wireless audio device 202-1 may include a first antenna (e.g., the first antenna 521 of FIG. 5), the communication circuit 491, and the processor 421 connected to the communication circuit 491. The processor 421 may be configured to obtain first positioning information by receiving a positioning signal from an external electronic device (e.g., the electronic device 201) and obtain, from the second wireless audio device 202-2 located in the case 202-3 together with the first wireless audio device 202-1, second positioning information for the positioning signal received by the second wireless audio device 202-2. The processor 421 may be configured to determine the angle of arrival of the positioning signal based on the first positioning information, the second positioning information, and a distance between the first wireless audio device 202-1 and the second wireless audio device 202-2, and transmit a response signal including information of the angle of arrival to the external electronic device. For example, the first wireless audio device 202-1 and the second wireless audio device 202-2 may be a pair of wireless audio devices. When the first wireless audio device 202-1 and the second wireless audio device 202-2 are located within the case 203, the distance between the first wireless audio device 202-1 and the second wireless audio device 202-2 may be fixed. The positioning signal and the response signal may be based on a Bluetooth protocol or BLE protocol. The response signal may further include information about reception strength of the positioning signal, transmission strength of the response signal, reception time of the positioning signal, or transmission time of the response signal.

Figure 5:
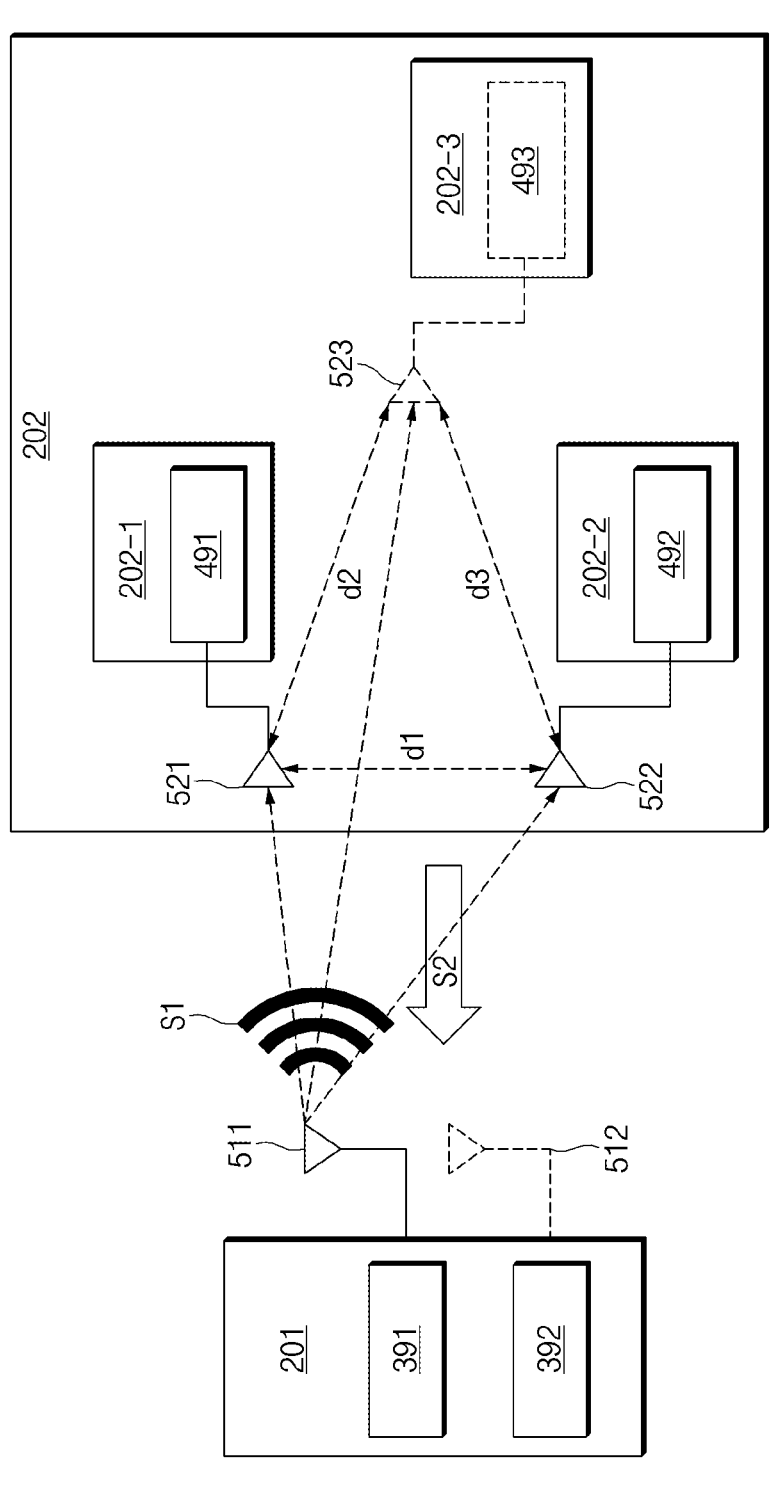
FIG. 5 is a diagram illustrating a measurement environment of an angle of arrival according to various embodiments.

According to an embodiment, the second wireless audio device 202-2 may include a second antenna (e.g., the second antenna 522 of FIG. 5). The distance between the first wireless audio device 202-1 and the second wireless audio device 202-2 may correspond to a distance between the first antenna and the second antenna. For example, the first positioning information may include phase information of the positioning signal received by the first antenna, and the second positioning information may include phase information of the positioning signal received by the second antenna.

According to an example embodiment, the wireless audio device 202 may include: a first wireless audio device 202-1 including a first antenna (e.g., the first antenna 521 of FIG. 5), a first communication circuit (e.g., the communication circuit 491) connected to the first antenna, and a first processor (e.g., the processor 421) connected to the first communication circuit, wherein the first wireless audio device 202-1 is configured to obtain first positioning information by receiving a positioning signal from an external electronic device using the first antenna; a second wireless audio device 202-2 including a second antenna (e.g., the second antenna 522 of FIG. 5), a second communication circuit (e.g., the communication circuit 492) connected to the second antenna, and a second processor (e.g., the processor 442) connected to the second communication circuit, wherein the second wireless audio device 202-2 is configured to obtain second positioning information by receiving the positioning signal using the second antenna; and the case 202-3 configured to accommodate the first wireless audio device 202-1 and the second wireless audio device 202-2. A master device among the first wireless audio device 202-1 and the second wireless audio device 202-2 may be configured to identify the angle of arrival of the positioning signal based on the first positioning information, the second positioning information, and a specified antenna distance, and transmit response information including information of the identified angle of arrival to the external electronic device (e.g., the electronic device 201). The specified antenna distance may be based on a distance between the first antenna and the second antenna when the first wireless audio device 202-1 and the second wireless audio device 202-2 are accommodated in the case 202-3. For example, the master device may be a specified device among the first wireless audio device 202-1 and the second wireless audio device 202-2. For example, the master device may be a device having highest reception strength or reception quality of the positioning signal among the first wireless audio device 202-1 and the second wireless audio device 202-2. When the first wireless audio device 202-1 and the second wireless audio device 202-2 are located within the case, the distance between the first wireless audio device 202-1 and the second wireless audio device 202-2 may be fixed. The first positioning information may include phase information of the positioning signal received by the first antenna, and the second positioning information may include phase information of the positioning signal received by the second antenna. The positioning signal and the response signal may be based on a Bluetooth protocol or BLE protocol. The response signal may further include information about reception strength of the positioning signal, transmission strength of the response signal, reception time of the positioning signal, or transmission time of the response signal.

According to an embodiment, the wireless audio device 202 may include: a first wireless audio device 202-1 including a first antenna (e.g., the first antenna 521 of FIG. 5), a first communication circuit (e.g., the communication circuit 491) connected to the first antenna, and a first processor (e.g., the processor 421) connected to the first communication circuit, wherein the first wireless audio device 202-1 is configured to obtain first positioning information by receiving a positioning signal from an external electronic device using the first antenna; a second wireless audio device 202-2 including a second antenna (e.g., the second antenna 522 of FIG. 5), a second communication circuit (e.g., the communication circuit 492) connected to the second antenna, and a second processor (e.g., the processor 442) connected to the second communication circuit, wherein the second wireless audio device 202-2 is configured to obtain second positioning information by receiving the positioning signal using the second antenna; and a case 202-3 including a third antenna (e.g., the third antenna 523 of FIG. 3), a third communication circuit (e.g., the communication circuit 493) connected to the third antenna, and a third processor (e.g., the processor 423) connected to the third communication circuit. A master device among the first wireless audio device 202-1, the second wireless audio device 202-2, and the case 202-3 may be configured to receive a positioning signal from an external electronic device (e.g., the electronic device 201) using two of the first wireless audio device 202-1, the second wireless audio device 202-2, and the case 202-3, obtain first positioning information and second positioning information based on the positioning signal received by each of the two devices, identify the angle of arrival of the positioning signal based on the first positioning information, the second positioning information, and a distance between antennas of the two devices, and transmit a response signal including the identified angle of arrival to the external electronic device. For example, the master device may be a specified device among the first wireless audio device 202-1, the second wireless audio device 202-2, and the case 202-3. For example, the master device may be a device having a highest value of at least one of reception strength or reception quality of a signal from the external electronic device among the first wireless audio device 202-1, the second wireless audio device 202-2, and the case 202-3. The two devices may include the first wireless audio device 202-1 and the second wireless audio device 202-2, the first positioning information may include phase information of the positioning signal received by the first antenna, and the second positioning information may include phase information of the positioning signal received by the second antenna. The positioning signal and the response signal may be based on a Bluetooth protocol or BLE protocol. The response signal may further include information about reception strength of the positioning signal, transmission strength of the response signal, reception time of the positioning signal, or transmission time of the response signal.

FIG. 5 is a diagram illustrating a measurement environment of an angle of arrival according to various embodiments.

Referring to FIG. 5, it may be assumed that the first wireless audio device 202-1 and the second wireless audio device 202-2 are located within the case 202-3. The communication circuit 491 of the first wireless audio device 202-1 may be connected to the first antenna 521, and the communication circuit 492 of the second wireless audio device 202-2 may be connected to the second antenna 522. The case 202-3 may include or may not include the communication circuit 493. If the case 202-3 includes the communication circuit 493, the communication circuit 493 may be connected to the third antenna 523.

For example, the electronic device 201 may include a first antenna 511. The first antenna 511 may be an antenna electrically connected to the second communication circuit 392. In an example, the electronic device 201 may further include a second antenna 512. The second antenna 512 may be selectively connected to the first communication circuit 391 or the second communication circuit 392.

For example, a distance between the first antenna 521 and the second antenna 522 may correspond to a first distance d1. A distance between the first antenna 521 and the third antenna 523 may correspond to a second distance d2. A distance between the second antenna 522 and the third antenna 523 may correspond to a third distance d3. The first distance d1, the second distance d2, and/or the third distance d3 may correspond to a physical distance between antennas or a distance of an electromagnetic path. For example, the first distance d1, the second distance d2, and the third distance d3 each may correspond to a half wavelength or ¼ wavelength of a first signal S1.

According to an embodiment, the wireless audio device 202 may obtain an angle of arrival using at least two of the first antenna 521, the second antenna 522, and the third antenna 523. For example, the electronic device 201 may transmit the first signal S1. The first signal S1 may be a signal for positioning. The wireless audio device 202 may receive the first signal S1 using at least two antennas, and may identify the angle of arrival of the first signal S1 based on a phase difference between the received first signals S1 and a distance between the antennas. As described below with reference to FIGS. 7 and 8, the first signal S1 may include time information, signal strength information, and/or specified packet for positioning.

According to an embodiment, a master device of the wireless audio device 202 may identify the angle of arrival of the first signal S1. The master device may be referred to as a device that performs positioning or communicates with the electronic device 201, among the first wireless audio device 202-1, the second wireless audio device 202-2, and the case 202-3. For example, the master device may be a specified device among the first wireless audio device 202-1, the second wireless audio device 202-2, and the case 202-3. For another example, the master device may be a device having highest reception strength and/or reception quality of a signal (e.g., the first signal S1) from the electronic device 201.

The wireless audio device 202 may use two antennas in positioning. For example, the wireless audio device 202 may perform positioning by receiving the first signal S1 using antennas of two specified devices among the first wireless audio device 202-1, the second wireless audio device 202-2, and the case 202-3. For another example, the wireless audio device 202 may determine devices to be used in positioning based on reception strength of a signal (e.g., the first signal S1) from the electronic device 201.

For example, the first antenna 521 and the second antenna 522 may be used in positioning. The first wireless audio device 202-1 may receive the first signal S1 using the first antenna 521, and the second wireless audio device 202-2 may receive the first signal S1 using the second antenna 522. The master device may acquire a phase difference between the first signals S1 received by the two antennas based on information of the first signals S1 received by the first wireless audio device 202-1 and the second wireless audio device 202-2.

For example, the first antenna 521 and the third antenna 523 may be used in positioning. The first wireless audio device 202-1 may receive the first signal S1 using the first antenna 521, and the case 202-3 may receive the first signal S1 using the third antenna 523. The master device may acquire a phase difference between the first signals S1 received by the two antennas based on information of the first signals S1 received by the first wireless audio device 202-1 and the case 202-3.

For example, the second antenna 522 and the third antenna 523 may be used in positioning. The second wireless audio device 202-2 may receive the first signal S1 using the second antenna 522, and the case 202-3 may receive the first signal S1 using the third antenna 523. The master device may obtain a phase difference between the first signals S1 received by the two antennas based on information of the first signals S1 received by the second wireless audio device 202-2 and the case 202-3.

The master device may acquire the phase difference by receiving the first signal S1 by itself or by obtaining reception information of the first signal S1 from another device. According to an embodiment, the master device may transmit, to the electronic device 201, a second signal S2 including information (e.g., angle of arrival, phase difference, distance between antennas, and/or information of a device used in positioning) about an angle of arrival. According to an embodiment, the master device may obtain the angle of arrival of the first signal S1 based on a distance (e.g., d1, d2, or d3) between antennas used for receiving the first signal S1 and the phase difference. The master device may transmit the second signal S2 including information of the obtained angle of arrival to the electronic device 201. The electronic device 201 may identify a direction of the wireless audio device 202 based on a received angle of arrival. According to an embodiment, the master device may transmit, to the electronic device 201, the second signal S2 including information (e.g., phase difference and a distance (e.g., d1, d2, or d3) between antennas used for receiving the first signal S1) required for obtaining the angle of arrival. The electronic device 201 may identify the direction of the wireless audio device 201 based on received information. According to an embodiment, the master device may transmit, to the electronic device 201, the second signal S2 including information (e.g., phase difference and/or information of a device used in positioning) required for obtaining the angle of arrival. The electronic device 201 may identify the direction of the wireless audio device 202 using received information and information (e.g., phase difference and a distance (e.g., d1, d2, or d3) between antennas used for receiving the first signal S1) stored in the electronic device 201.

According to an embodiment, the master device may identify a distance between the electronic device 201 and the wireless audio device 202 using the first signal S1. For example, the master device may identify the distance based on reception strength of the first signal S1. For another example, the master device may identify the distance based on a reception time of the first signal S1. If the first signal S1 includes transmission time information (e.g., clock information), the master device may identify the distance by comparing reception time and transmission time information of the first signal S1. The above distance identification method is only an example, and the master device may identify the distance using a known distance identification method. The master device may include the identified distance in the second signal S2.

According to an embodiment, the electronic device 201 may receive the second signal S2 using at least one antenna. The electronic device 201 may receive the second signal S2 received through the first antenna 511 and/or the second antenna 512 using the second communication circuit 392. When the electronic device 201 receives the second signal S2 using the first antenna 511 or the second antenna 512, the electronic device 201 may identify a location (e.g., direction and distance) of the wireless audio device 202 using the second signal S2. When the electronic device 201 receives the second signal S2 using the first antenna 511 and the second antenna 512, the electronic device 201 may identify the location of the wireless audio device 202 using the second signal S2 received by the first antenna 511 and the second signal S2 received by the second antenna 512. The electronic device 201 may improve accuracy of positioning by receiving the second signal S2 using two antennas.

According to an embodiment, the electronic device 201 may identify the location of the wireless audio device 202 by receiving the second signal S2. For example, the second signal S2 may include information about an angle of arrival and information about a distance. If the information about the angle of arrival includes information for identifying the angle of arrival, the electronic device 201 may identify the angle of arrival using this information, and may identify the direction of the wireless audio device 202 relative to the electronic device 201 according to the identified angle of arrival. The information about a distance may include, for example, time information and/or signal strength information. The time information may include reception time of the first signal S1 received by the wireless audio device 202 and/or transmission time information of the second signal S2 transmitted from the wireless audio device 202. The electronic device 201 may obtain time of flight (ToF) based on the time information, and may identify the distance based on the ToF. The signal strength information may include reception strength (e.g., received signal strength indicator (RSSI)) of the first signal S1 received by the wireless audio device 202 and/or transmission strength of the second signal S2 transmitted therefrom. The electronic device 201 may identify the distance based on a difference between the transmission strength and the reception strength of the first signal S1 and/or a difference between the reception strength and the transmission strength of the second signal S2. According to an example, the electronic device 201 may identify the distance in consideration of both the time information and the signal strength information.

Figure 6:
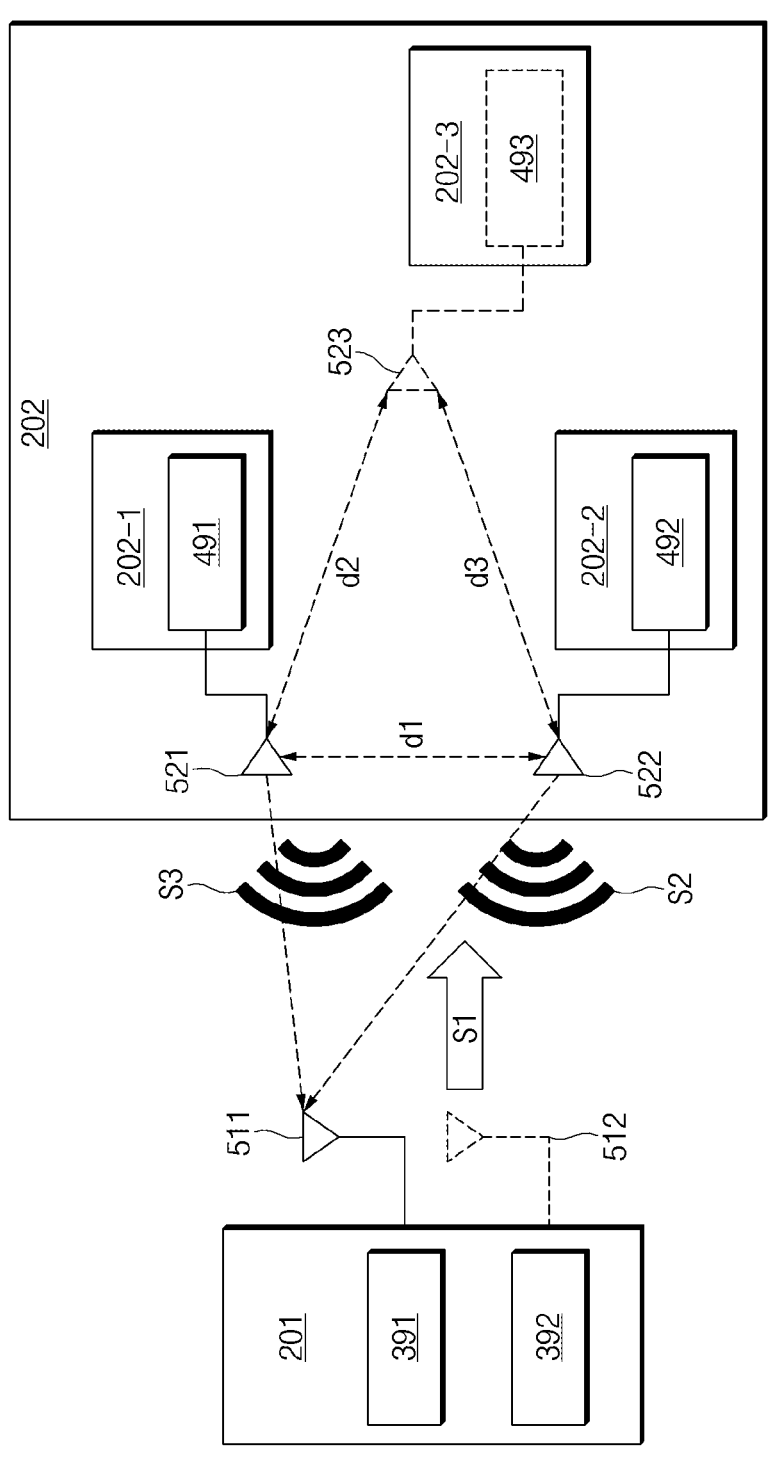
FIG. 6 is a diagram illustrating a measurement environment of an angle of departure according to various embodiments.

FIG. 6 is a diagram illustrating a measurement environment of an angle of departure according to various embodiments.

Referring to FIG. 6, it may be assumed that the first wireless audio device 202-1 and the second wireless audio device 202-2 are located inside the case 202-3. The above descriptions provided above with reference to FIG. 5 may be applied to FIG. 6 unless otherwise described.

According to an embodiment, the wireless audio device 202 may receive the first signal S1 from the electronic device 201. In the example of FIG. 6, the first signal S1 may include information requesting the wireless audio device 202 to transmit a signal for positioning.

According to an embodiment, at least two devices in the wireless audio device 202 may transmit the signal for positioning. For example, two devices having high reception strength of the first signal S1 may transmit the second signal S2 and a third signal S3. For another example, two specified devices among devices in the wireless audio device 202 may transmit the second signal S2 and the third signal S3.

For example, the first wireless audio device 202-1 may transmit the second signal S3, and the second wireless audio device 202-2 may transmit the third signal S2. The electronic device 201 may receive the second signal S2 and the third signal S3 using the first antenna 511 and/or the second antenna 512. The electronic device 201 may identify an angle of departure based on a phase difference between the second signal S2 and the third signal S3 and a distance between the first antenna 511 and the second antenna 512. The electronic device 201 may identify the direction of the wireless audio device 202 based on the identified angle of departure. The electronic device 201 may, for example, obtain information about a distance (e.g., d1) between the first antenna 521 and the second antenna 522 from a memory. For another example, the electronic device 201 may obtain information about the distance between the first antenna 521 and the second antenna 522 from the wireless audio device 202.

According to an embodiment, the electronic device 201 may identify a distance to the wireless audio device 202 by receiving the second signal S2 and/or the third signal S3. For example, the second signal S2 and/or the third signal S3 may include time information and/or signal strength information. The time information may include reception time of the first signal S1 received by the wireless audio device 202 and/or transmission time information of the second signal S2 and/or third signal S3 transmitted from the wireless audio device 202. The electronic device 201 may obtain time of flight (ToF) based on the time information, and may identify the distance based on the ToF. The signal strength information may include reception strength (e.g., received signal strength indicator (RSSI)) of the first signal S1 received by the wireless audio device 202 and/or transmission strength of the second signal S2 transmitted therefrom. The electronic device 201 may identify the distance based on a difference between the transmission strength and the reception strength of the first signal S1 and/or a difference between the reception strength and the transmission strength of the second signal S2. According to an example, the electronic device 201 may identify the distance in consideration of both the time information and the signal strength information.

Figure 7:
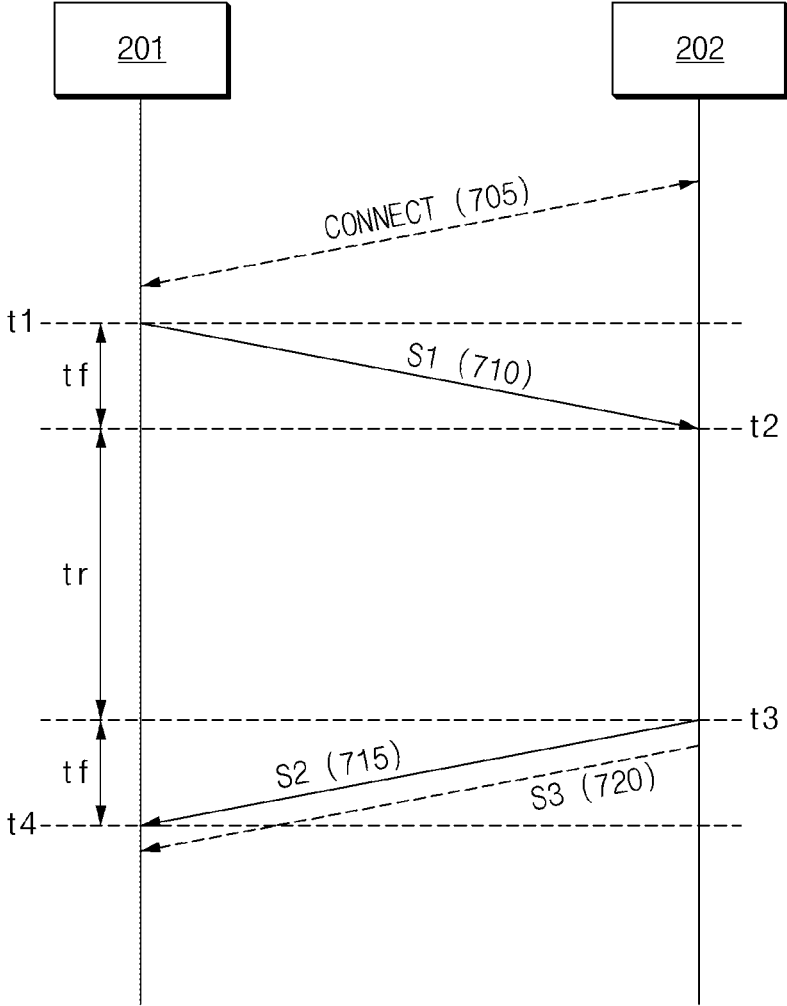
FIG. 7 is a signal flow diagram for positioning according to various embodiments.

FIG. 7 is a signal flow diagram for positioning according to various embodiments.

In operation 705, the electronic device 201 and the wireless audio device 202 may be connected. For example, if a specified application or function (e.g., application or function associated with a search for the wireless audio device 202) is executed in the electronic device 201, the electronic device 201 may perform connection to the wireless audio device 202. For example, the electronic device 201 may attempt to connect to the wireless audio device 202 using information of the wireless audio device 202 stored in the electronic device 201. The electronic device 201 may obtain the information of the wireless audio device 202 through pairing with the wireless audio device 202. The electronic device 201 may be connected to the wireless audio device 202 by transmitting a signal (e.g., advertisement) for connection and receiving a response signal for the transmitted signal from the wireless audio device 202.

In operation 710, the electronic device 201 may transmit the first signal S1 to the wireless audio device 202. The above descriptions provided above with reference to FIGS. 5 and 6 may be referenced with regard to the first signal S1. In the example of FIG. 7, the first signal S1 may include information of transmission time t1. The first signal S1 may be received by the wireless audio device 202 at a time t2. Since the electronic device 201 and the wireless audio device 202 are synchronized, the time t1 and time t2 may be indicated based on a clock (clock of a master device between the electronic device 201 and the wireless audio device 202).

In operation 715, the wireless audio device 202 may transmit the second signal S2 to the electronic device 201. The above descriptions provided above with reference to FIGS. 5 and 6 may be referenced with regard to the second signal S2. In the example of FIG. 7, the second signal S2 may include information about the reception time t2, transmission time t3, and/or processing time t3−t2. The electronic device 201 may receive the second signal S2 at a time t4. The electronic device 201 may identify the ToF using a difference between the time t4 and the time t1 and the processing time t3−t2.

In a case of measuring the angle of departure, in operation 720, the wireless audio device 202 may transmit the third signal S3 to the electronic device 201. The third signal S3 may be a signal that is transmitted at substantially the same time as the second signal S2 and transmitted using an antenna different from that for the second signal S2. In a case in which the wireless audio device 202 transmits the second signal S2 and the third signal S3, the electronic device 201 may obtain the angle of departure using the second signal S2 and the third signal S3.

Although FIG. 7 illustrates that the electronic device 201 and the wireless audio device 202 are connected, embodiments of the disclosure are not limited thereto. For example, the electronic device 201 may fail to connect to the wireless audio device 202. If the wireless audio device 202 is located outside coverage of the electronic device 201, the electronic device 201 may fail to connect to the wireless audio device 202. For example, the electronic device 201 may continuously attempt to connect to the wireless audio device 202 until connection to the wireless audio device 202 succeeds or before a specified time has elapsed. For example, the electronic device 201 may search for the wireless audio device 202 using another device that may be connected to the electronic device 201. The electronic device 201 may cause at least one external electronic device that may be connected to the electronic device 201 to transmit a signal (e.g., advertisement) for searching for the wireless audio device 202. When one external electronic device receives a response of the wireless audio device 202, the electronic device 201 may provide information (e.g., distance and/or direction of the external electronic device) for a user to move to the external electronic device. As the electronic device 201 moves to the external electronic device, the electronic device 201 may be connected to the wireless audio device.

In the example of FIG. 7, the electronic device 201 and the wireless audio device 202 perform ranging (e.g., single side-two way ranging) one time, but embodiments of the disclosure are not limited thereto. For example, the electronic device 201 and the wireless audio device 202 may perform dual side-two way ranging (DS-TWR). The electronic device 201 may transmit a response signal for the second signal S2 and/or the third signal S3. The wireless audio device 202 may identify the location of the electronic device 201 using the response signal.

Figure 8:
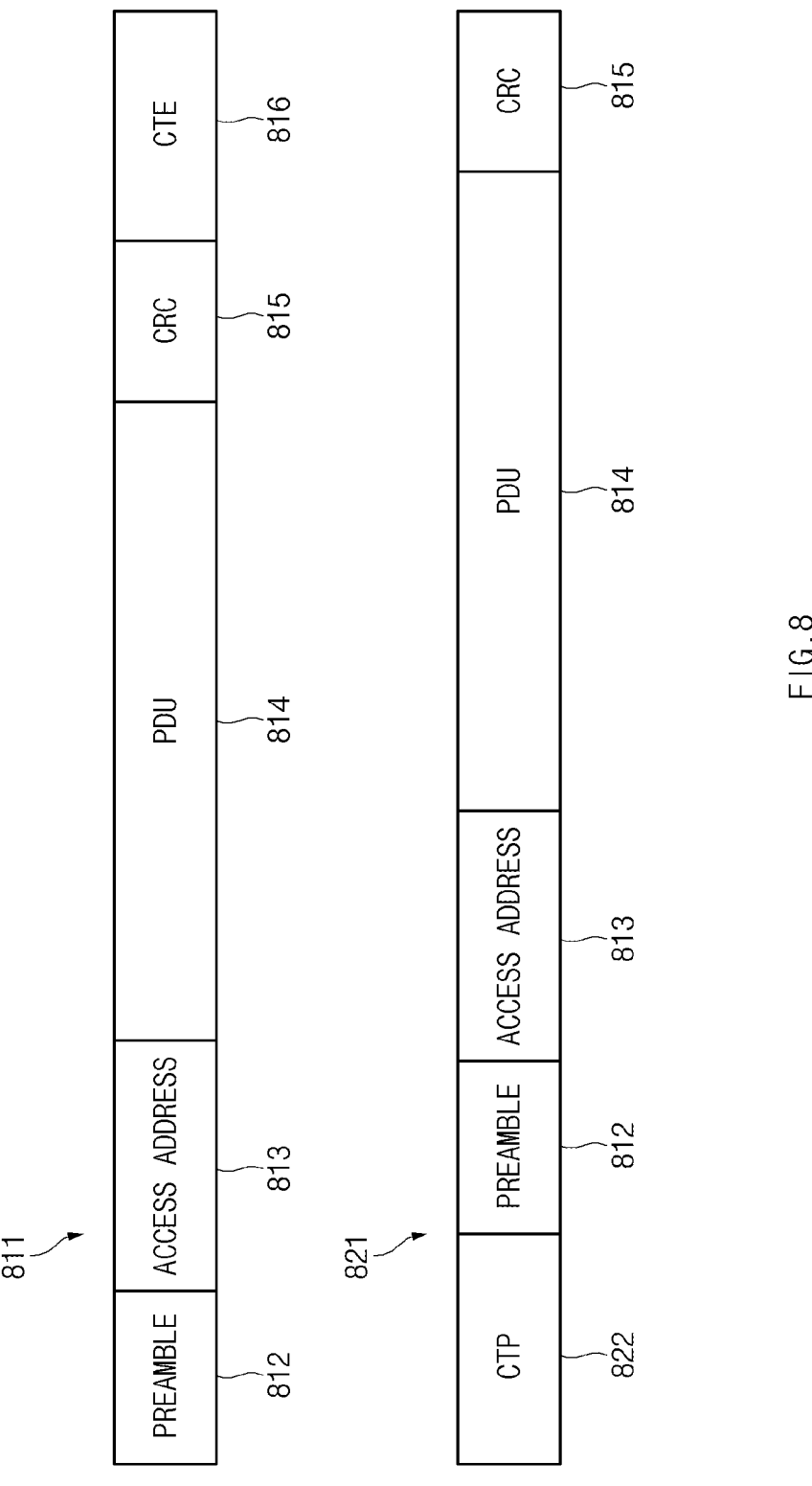
FIG. 8 is a diagram illustrating examples of a Bluetooth packet for positioning according to various embodiments.

FIG. 8 is a diagram illustrating examples of a Bluetooth packet for positioning for various embodiments.

Referring to FIG. 8, a first packet 811 represents an example of a packet structure that may be used in Bluetooth communication. For example, the first signal S1 of FIGS. 6 and 7 may include the first packet 811.

For example, the first packet 811 may include a preamble 812, an access address 813, a packet data unit (PDU) 814, a cyclic redundancy check (CRC) 815, and a constant tone extension (CTE) 816.

The preamble 812 may be used for internal protocol management. For example, the preamble 812 may have a specified value based on the type (e.g., advertisement channel PDU or data channel PDU) of the PDU 814. The access address 813 may have a specified value based on the type of the PDU 814. For example, in a case of a data channel PDU, the access address 813 may include a network address associated with a logical link between two electronic devices. For example, in a case of an advertisement channel PDU, the access address 813 may include a specified value. The CRC 815 may include a value for data validation of the PDU 814.

The CTE 816 may include a signal for in-phase and quadrature (IQ) sampling of a receiving end. For example, the CTE 816 may be a signal that is, for example, composed of identical symbols (e.g., 1 or 0) and continues for a specified time. The receiving end may identify a phase of a received signal by performing the IQ sampling using the CTE 816.

Referring to FIG. 8, a second packet 821 represents an example of a packet structure that may be used in Bluetooth communication. For example, the second signal S2 and/or third signal S3 of FIGS. 6 and 7 may include the second packet 821.

For example, the second packet 812 may include a constant tone preamble (CTP) 822, the preamble 812, the access address 813, the PDU 814, and the CRC 815.

The CTP 822 may include a signal for in-phase and quadrature (IQ) sampling of a receiving end of the second packet 821. For example, the CTP 822 may be a signal that is, for example, composed of identical symbols (e.g., 1 or 0) and continues for a specified time. The receiving end may identify a phase of a received signal by performing the IQ sampling using the CTP 822.

Figure 9:
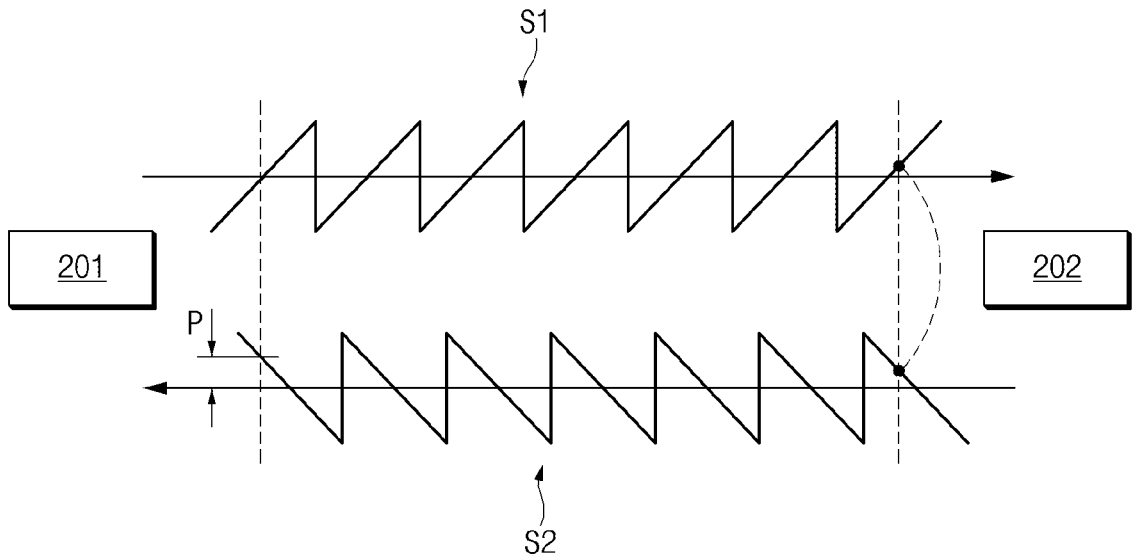
FIG. 9 is a diagram illustrating a phase information preservation signal according to various embodiments.

FIG. 9 is a diagram illustrating a phase information preservation signal according to various embodiments.

Referring to FIG. 9, the electronic device 201 may transmit the first signal S1, and the wireless audio device 202 may respond to the first signal S1 using the second signal S2. As illustrated in FIG. 9, the second signal S2 may preserve information about a reception phase P of the first signal S1. That is, the wireless audio device 202 may configure a phase of the second signal S2 like a reflected signal of the first signal S1 so that the reception phase P of the first signal S1 is delivered to the electronic device 201 by the second signal S2.

According to an embodiment, the electronic device 201 may perform positioning of the wireless audio device 202 further based on the reception phase P of the second signal S2. The accuracy of positioning of the electronic device 201 may be improved using the reception phase P. For example, the electronic device 201 may perform positioning using information (e.g., information of an angle of arrival and/or information associated with a distance) included in the second signal S2 and the reception phase P. For example, the electronic device 201 may determine the distance between the electronic device 201 and the wireless audio device 202 using the reception phase P and the information associated with a distance.

Figure 10:
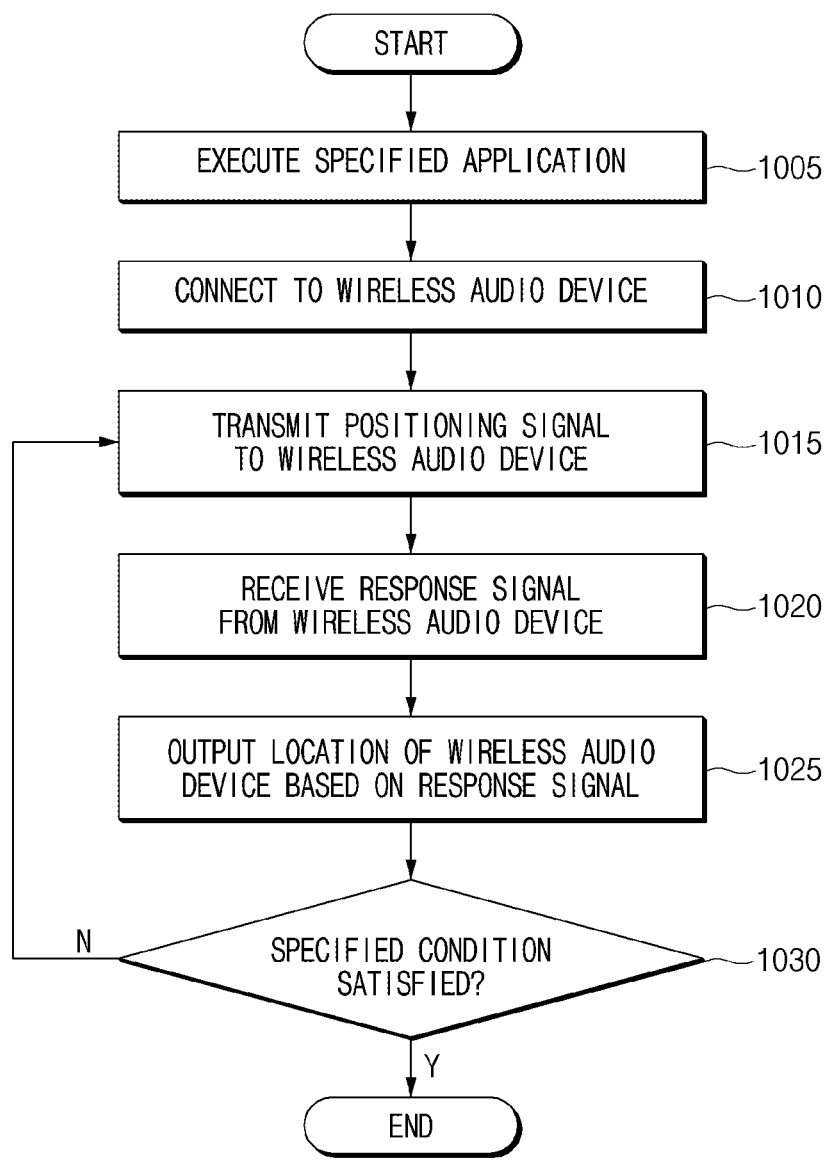
FIG. 10 is a flowchart illustrating an example positioning method of an example electronic device according to various embodiments.

FIG. 10 is a flowchart illustrating an example positioning method of an example electronic device according to various embodiments.

According to an embodiment, the electronic device 201 may determine the location of the wireless audio device 202.

In operation 1005, the electronic device 201 may execute a specified application (e.g., application for searching for another device). For example, the electronic device 201 may execute the specified application based on a user's input. If the specified application is executed, the electronic device 201 may provide a user interface (e.g., display).

In operation 1010, the electronic device 201 may be connected to the wireless audio device 202. For example, the electronic device 201 may be connected to the wireless audio device 202 based on a Bluetooth protocol. The electronic device 201 may be connected to the wireless audio device 202 by being connected to the first wireless audio device 202-1, the second wireless audio device 202-2, or the case 202-3 of the wireless audio device 202. After performing operation 1010, the electronic device 201 and the wireless audio device 202 may be synchronized.

As described above with reference to FIG. 7, if the electronic device 201 fails to connect to the wireless audio device 202, the electronic device 201 may attempt connection for a specified time. While attempting connection, the electronic device 201 may display information indicating the attempt to connect on a user interface. For example, the electronic device 201 may search for the wireless audio device 202 using an external device that may be connected to the electronic device 201. In this case, the electronic device 201 may display, on the user interface, guide information for moving toward the external device.

In operation 1015, the electronic device 201 may transmit a positioning signal (e.g., the first signal S1 of FIG. 5, 6, 7, or 9) to the wireless audio device 202. For example, the positioning signal may include time information (e.g., transmission time information of the positioning signal), signal strength information (e.g., transmission strength information of the positioning signal), and/or a specified packet (e.g., the first packet 811 of FIG. 8). For example, the positioning signal may be a signal requesting the wireless audio device 202 to transmit a response signal.

In operation 1020, the electronic device 201 may receive a response signal (e.g., the second signal S2 and/or third signal S3 of FIG. 5, 6, 7, or 9) from the wireless audio device 202. For example, the wireless audio device 202 may be configured to transmit a response signal after a specified time (e.g., t3–t2 of FIG. 7) if the positioning signal is received from the electronic device 201. For example, the response signal may include time information (e.g., reception time information of the positioning signal and/or transmission time information of the response signal), signal strength information (e.g., reception strength information of the positioning signal and/or transmission strength information of the response signal), and/or a specified packet (e.g., the second packet 821 of FIG. 8). In a case in which the wireless audio device 202 receives the positioning signal using a plurality of antennas, the response signal may include information about an angle of arrival. For another example, the wireless audio device 202 may transmit the response signal using a plurality of antennas so as to cause the electronic device 201 to measure the angle of departure of the response signal.

In operation 1025, the electronic device 201 may output the location of the wireless audio device 202 based on the response signal. For example, the location of the wireless audio device 202 may include the distance and direction of the wireless audio device 202. The electronic device 202 may identify the direction of the wireless audio device 202 based on the angle of arrival or the angle of departure, and may identify the distance to the wireless audio device based on the signal strength or ToF.

In an example, the electronic device 201 may output a graphic object, text information, and/or audio information indicating the location of the wireless audio device 202. The electronic device 201 may output a user interface including a map or radar screen, and may display, on the user interface, an indicator indicating the location of the wireless audio device 202. The electronic device 201 may display an image obtained using a rear camera, and may display the indicator indicating the location of the wireless audio device 202 on the displayed image.

In operation 1030, the electronic device 201 may determine whether a specified condition is satisfied. The specified condition may represent a condition for ending tracking of the wireless audio device 202. The specified condition may be satisfied, for example, when the specified application is ended, when a user input for ending tracking of the wireless audio device 202 is received, when a specified time has elapsed, or when a battery charging amount of the electronic device 201 decreases to a specified value or less. When the specified condition is satisfied, the electronic device 201 may end tracking of the wireless audio device 202. When the specified condition is not satisfied, the electronic device 201 may continue to track the wireless audio device 202 by re-performing operation 1015.

FIG. 11 is a flowchart illustrating an example angle-of-arrival-based positioning method of an example wireless audio device according to various embodiments.

In operation 1105, the wireless audio device 202 may be connected to the electronic device 201. For example, the wireless audio device 202 may be connected to the electronic device 201 based on a Bluetooth protocol. The wireless audio device 201 may be connected to the electronic device 201 using the first wireless audio device 202-1, the second wireless audio device 202-2, or the case 202-3 of the wireless audio device 202. After performing operation 1105, the electronic device 201 and the wireless audio device 202 may be synchronized.

In operation 1110, the wireless audio device 202 may identify a master device to be used to communicate with the electronic device 201. For example, the wireless audio device 202 may identify, as the master device, a device having a highest value of at least one of reception strength or signal quality of a signal received from the electronic device 201 among the first wireless audio device 202-1, the second wireless audio device 202-2, and the case 202-3. In an example, the master device may be a specified device. In this case, operation 1110 may be skipped.

In operation 1115, the master device may receive a positioning signal (e.g., the first signal S1 of FIG. 5, 6, 7, or 9) from the electronic device 201 using a plurality of antennas. For example, the master device may receive the positioning signal using an antenna of the master device and an antenna of another device in the wireless audio device 202. For another example, the master device may receive the positioning signal using antennas of other wireless audio devices of the wireless audio device 202. According to an embodiment, the master device may determine a device to be used to receive the positioning signal based on at least one of received signal strength or received signal quality.

In operation 1120, the master device may obtain positioning signal reception information. For example, the master device may obtain the positioning signal reception information (e.g., at least one of strength, phase, or reception time of a received signal) from the device used to receive the positioning signal. In a case in which the master device receives the positioning signal, the master device may generate the positioning signal reception information by receiving the positioning signal. The master device may obtain reception information of the positioning signal by aggregating the positioning signal reception information.

In operation 1122, the master device may obtain positioning information. The master device may obtain the angle of arrival of the positioning signal based on a distance between antennas used in the positioning signal and a reception phase of the positioning signal reception information. The master device may obtain the angle of arrival based on a difference between reception phases of the positioning signal and the distance between the antennas. The master device may obtain the distance between the electronic device 201 and the wireless audio device 202 using at least one of the reception time or reception strength of the positioning signal. For example, the positioning information may include at least one of the information of the angle of arrival or the distance between the electronic device 201 and the wireless audio device 202.

In operation 1125, the master device may transmit, to the electronic device 201, a response signal (e.g., the second signal S2 of FIG. 5, 7, or 9) including the positioning information or the positioning signal reception information.

For example, if the response signal includes the positioning signal reception information, the electronic device 201 may obtain (e.g., calculate) information about the distance and the angle of arrival of the wireless audio device 202 using the positioning signal reception information. In this case, operation 1122 may be skipped. The electronic device 201 may obtain the information about the angle of arrival using the positioning signal reception information and information (e.g., identification information or antenna distance information) of a device (e.g., at least two of the first wireless audio device 202-1, the second wireless audio device 202-2, and the case 202-3) that has received the positioning signal. The electronic device 201 may receive, from the wireless audio device 202, information about an antenna distance between devices that have received the positioning signal. Since the electronic device 201 has information about antenna distances between devices in the wireless audio device 202 and receives, from the wireless audio device 202, identification information about the devices that have received the positioning signal, the electronic device 201 may identify the information about the antenna distance between the devices that have received the positioning signal.

For another example, if the response signal includes the positioning information, the information about the distance and the angle of arrival of the wireless audio device 202 may be calculated by the master device.

In operation 1130, the master device may determine whether a specified condition is satisfied. The specified condition may represent a condition for ending location tracking for the wireless audio device 202. The specified condition may be satisfied, for example, when a specified signal is received from the electronic device 201, when an input to the wireless audio device 202 is received, when a specified time has elapsed, or when a battery charging amount of the wireless audio device 202 decreases to a specified value or less. When the specified condition is satisfied, the wireless audio device 202 may end positioning with the wireless audio device 201. When the specified condition is not satisfied, the wireless audio device 202 may continue to perform positioning by re-performing operation 1115.

According to an embodiment, the wireless audio device 202 may identify the distance between the electronic device 201 and the wireless audio device 202 by receiving the positioning signal. The wireless audio device 202 may be configured to output a specified audio (e.g., beep) if the electronic device 201 is located within a specified distance.

In example embodiments of the disclosure, tracking of the wireless audio device 202 by the electronic device 201 may involve 4-stage feedback. For example, when the electronic device 201 is not able to track the wireless audio device 202 at all, the electronic device 201 may provide stage 1 feedback (e.g., information indicating that the wireless audio device 202 cannot be found). When the electronic device 201 is unable to be connected to the wireless audio device 202, but the wireless audio device 202 has been found by an external electronic device, the electronic device 201 may provide stage 2 feedback (e.g., guide information about the distance to the external electronic device). When the electronic device 201 is connected to the wireless audio device 202, but the wireless audio device 202 is not located within a specified distance, the electronic device 201 may provide stage 3 feedback (e.g., guide information about the distance and direction of the wireless audio device 202). When the electronic device 201 is connected to the wireless audio device 202, and the wireless audio device 202 is located within the specified distance, the wireless audio device 202 may provide additional stage 4 feedback (e.g., output a specified audio).

Figure 12:
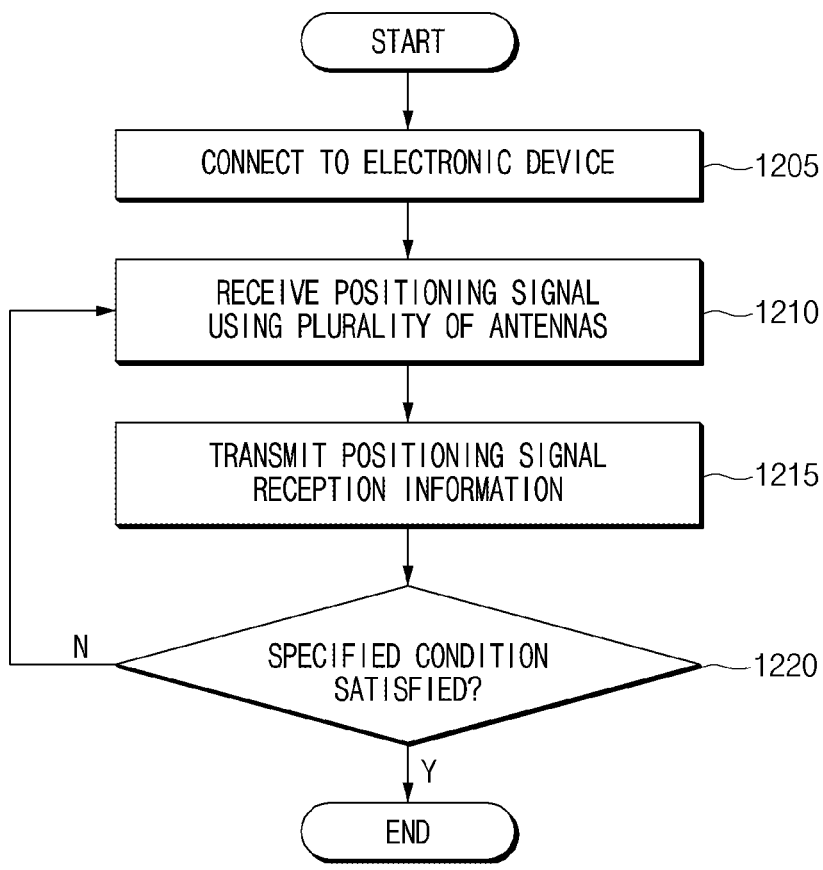
FIG. 12 is a flowchart illustrating an example angle-of-arrival-based positioning method of an example wireless audio device according to various embodiments.

FIG. 12 is a flowchart illustrating an example angle-of-arrival-based positioning method of an example wireless audio device according to various embodiments.

In operation 1205, the wireless audio device 202 may be connected to the electronic device 201. For example, the wireless audio device 202 may be connected to the electronic device 201 based on a Bluetooth protocol. The wireless audio device 201 may be connected to the electronic device 201 using the first wireless audio device 202-1, the second wireless audio device 202-2, or the case 202-3 of the wireless audio device 202. After performing operation 1205, the electronic device 201 and the wireless audio device 202 may be synchronized.

In operation 1210, the wireless audio device 202 may receive a positioning signal (e.g., the first signal S1 of FIG. 5, 6, 7, or 9) from the electronic device 201 using a plurality of antennas. For example, the wireless audio device 202 may receive the positioning signal using an antenna of at least one of the first wireless audio device 202-1, the second wireless audio device 202-2, or the case 202-3.

In operation 1215, the wireless audio device 202 may transmit, to the electronic device 201, a response signal (e.g., the second signal S2 of FIG. 5, 7, or 9) including positioning signal reception information. For example, at least one of the first wireless audio device 202-1, the second wireless audio device 202-2, or the case 202-3 may receive the positioning signal, thereby obtaining the positioning signal reception information (e.g., at least one of strength, phase, or reception time of the received signal). For example, at least one of the first wireless audio device 202-1, the second wireless audio device 202-2, or the case 202-3 may transmit the positioning signal reception information to the electronic device 201. The electronic device 201 may obtain (e.g., calculate) information about the distance and the angle of arrival of the wireless audio device 202 using the positioning signal reception information. The electronic device 201 may obtain the information about the angle of arrival using the positioning signal reception information and information (e.g., identification information or antenna distance information) of a device (e.g., at least two of the first wireless audio device 202-1, the second wireless audio device 202-2, and the case 202-3) that has received the positioning signal. The electronic device 201 may receive, from the wireless audio device 202, information about an antenna distance between devices that have received the positioning signal. Since the electronic device 201 has information about antenna distances between devices in the wireless audio device 202 and receives, from the wireless audio device 202, identification information about the devices that have received the positioning signal, the electronic device 201 may identify the information about the antenna distance between the devices that have received the positioning signal.

In operation 1220, the wireless audio device 202 (e.g., each of the devices in the wireless audio device 202 that have received the positioning signal) may determine whether a specified condition is satisfied. The specified condition may represent a condition for ending location tracking for the wireless audio device 202. The specified condition may be satisfied, for example, when a specified signal is received from the electronic device 201, when an input to the wireless audio device 202 is received, when a specified time has elapsed, or when a battery charging amount of the wireless audio device 202 decreases to a specified value or less. When the specified condition is satisfied, the wireless audio device 202 may end positioning with the wireless audio device 201. When the specified condition is not satisfied, the wireless audio device 202 may continue to perform positioning by re-performing operation 1210.

Figure 13:
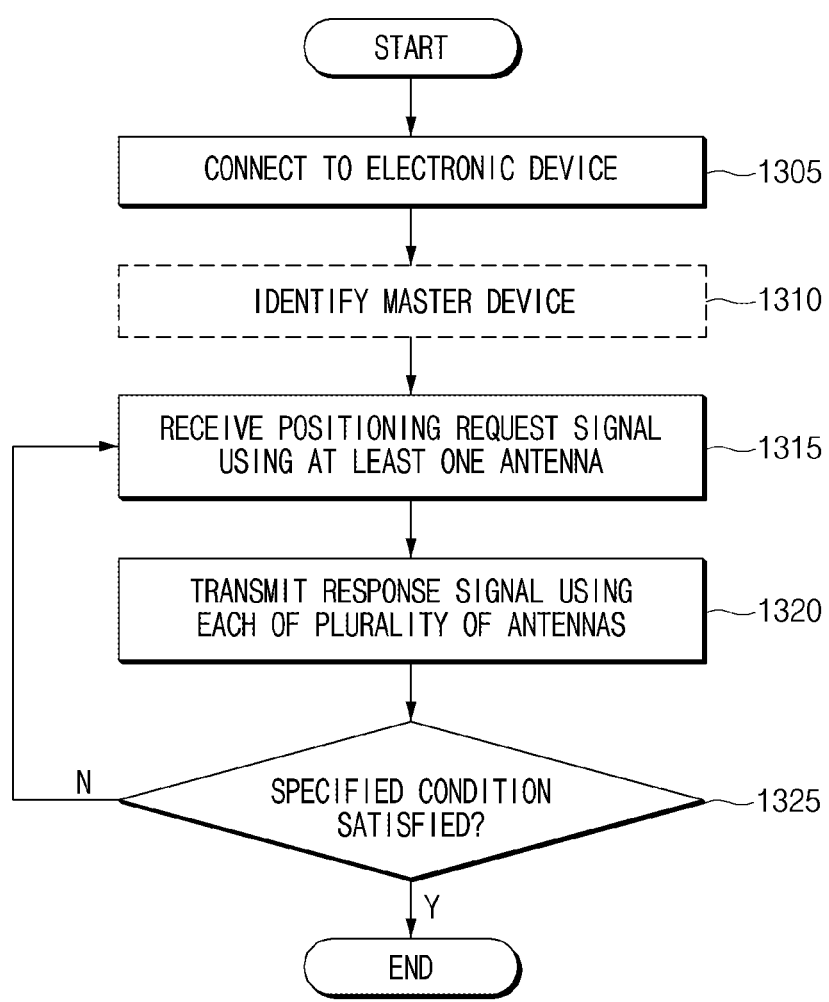
FIG. 13 is a flowchart illustrating an example angle-of-departure-based positioning method of an example wireless audio device according to various embodiments.

FIG. 13 is a flowchart illustrating an example angle-of-departure-based positioning method of an example wireless audio device according to various embodiments.

In operation 1305, the wireless audio device 202 may be connected to the electronic device 201. For example, the wireless audio device 202 may be connected to the electronic device 201 based on a Bluetooth protocol. The wireless audio device 201 may be connected to the electronic device 201 using the first wireless audio device 202-1, the second wireless audio device 202-2, or the case 202-3 of the wireless audio device 202. After performing operation 1305, the electronic device 201 and the wireless audio device 202 may be synchronized.

In operation 1310, the wireless audio device 202 may identify a master device to be used to communicate with the electronic device 201. For example, the wireless audio device 202 may identify, as the master device, a device having a highest value of at least one of reception strength or signal quality of a signal received from the electronic device 201 among the first wireless audio device 202-1, the second wireless audio device 202-2, and the case 202-3. In an example, the master device may be a specified device. In this case, operation 1310 may be skipped.

In operation 1315, the master device may receive a positioning signal (e.g., the first signal S1 of FIG. 6, 7, or 9) from the electronic device 201 using at least one antenna. For example, the master device may receive the positioning signal using an antenna of the master device.

In operation 1320, the master device may transmit a response signal (e.g., the second signal S2 and/or third signal S3 of FIG. 6, 7, or 9) using each of a plurality of antennas. For example, the master device may determine a plurality of devices to be used to transmit the response signal based on reception strength of the positioning signal, and may transmit the response signal using each of antennas of the plurality of devices. For another example, the master device may transmit the response signal using a plurality of specified devices.

According to an embodiment, the response signal may include information about a distance between antennas used to transmit the response signal, information about devices used to transmit the response signal, transmission time information of the response signal, reception time information of the positioning signal, transmission strength information of the response signal, and/or reception strength information of the positioning signal.

In operation 1325, the master device may determine whether a specified condition is satisfied. The specified condition may represent a condition for ending location tracking for the wireless audio device 202.

Figure 14:
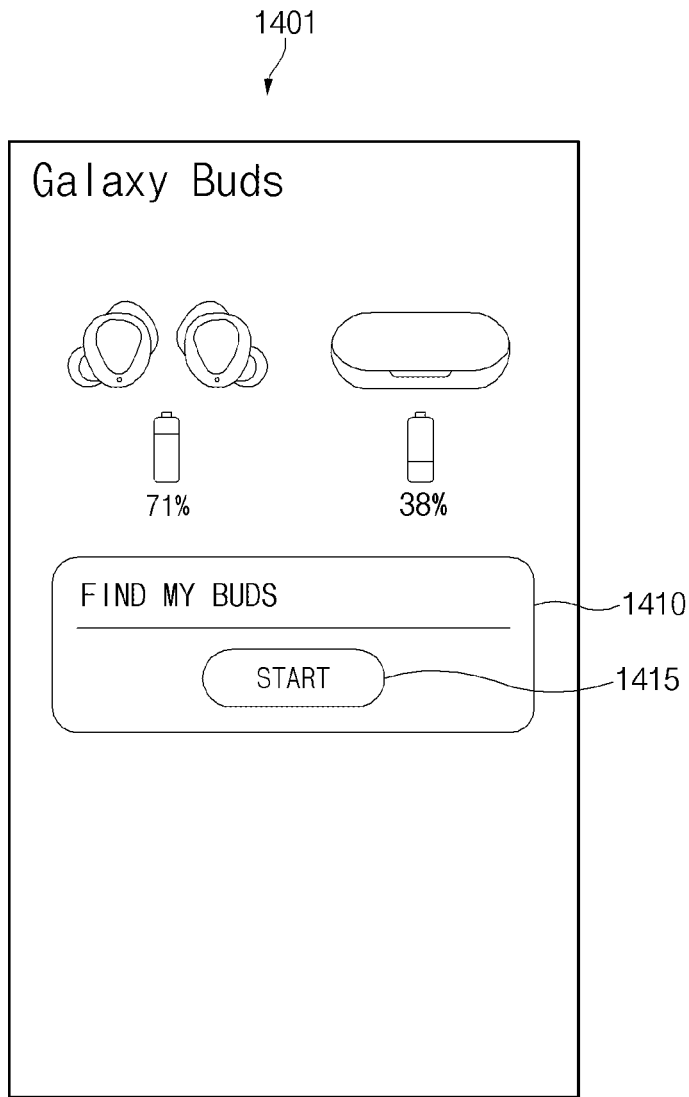
FIG. 14 is a diagram illustrating a first example user interface of an example electronic device according to various embodiments.

FIG. 14 is a diagram illustrating a first example user interface of an example electronic device according to various embodiments.

According to an embodiment, the electronic device 201 may provide a first user interface 1401 for controlling settings of the wireless audio device 202. The first user interface 1401 may include a menu 1410 for searching for the wireless audio device 202. For example, when an input to a button 1415 is received, the electronic device 201 may begin to search for the wireless audio device 202. For example, operation 1005 of FIG. 10 may include reception of a user input to the button 1415. The user interface 1401 illustrated in FIG. 14 is an example, and embodiments of the disclosure are not limited thereto. For example, when an input to the button 1415 is received, the electronic device 201 may display the second user interface or the third user interface of FIG. 15 or 16.

Figure 15:
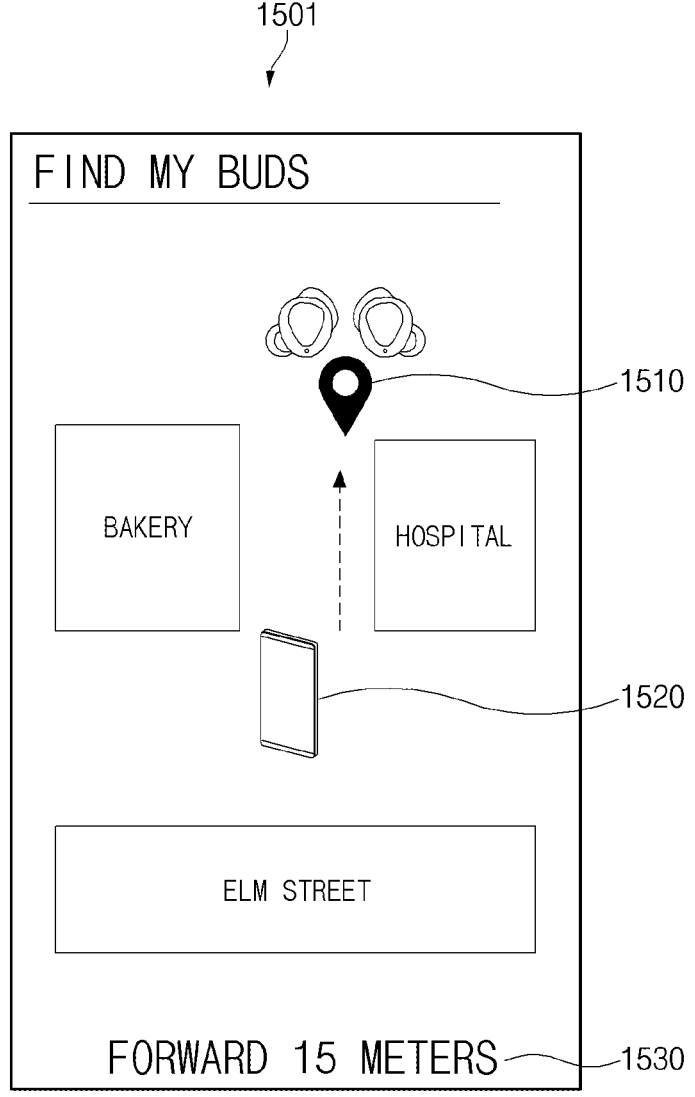
FIG. 15 is a diagram illustrating a second example user interface of an example electronic device according to various embodiments.

FIG. 15 is a diagram illustrating a second example user interface of an example electronic device according to various embodiments.

According to an embodiment, the electronic device 201 may display a second user interface 1501. For example, the second user interface 1501 may include a map. The electronic device 201 may display, on the map, an indicator 1510 indicating the location of the wireless audio device 202. For example, the electronic device 201 may display guide information 1530 for guiding movement to the wireless audio device 202.

FIG. 16 is a diagram illustrating a third example user interface of an example electronic device according to various embodiments.

According to an embodiment, the electronic device 201 may display a third user interface 1601. For example, the third user interface 1601 may include an image obtained by a camera of the electronic device 201. The electronic device 201 may display, on the display, an indicator 1610 indicating the location of the wireless audio device 202. For example, the electronic device 201 may display the indicator based on augmented reality.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A first wireless audio device comprising:
a first antenna;
a communication circuit connected to the first antenna; and
at least one processor, comprising processing circuitry, connected to the communication circuit and configured, individually or collectively, to control the first wireless audio device to:
obtain first positioning information by receiving a positioning signal from an external electronic device via the first antenna, when the first wireless audio device and a second wireless audio device is accommodated in a case configured to accommodate the first wireless audio device and the second wireless audio device at a predetermined position with respect to each other,
obtain second positioning information from a second wireless audio device configured to receive the positioning signal when the first wireless audio device and the second wireless audio device are accommodated in the case, determine an angle of arrival of the positioning signal based on the first positioning information, the second positioning information, and a distance between the first antenna and a second antenna of the second wireless audio device when the first wireless audio device and the second wireless audio device are accommodated in the case, and transmit a response signal including information of the angle of arrival to the external electronic device.

2. The first wireless audio device of claim 1, wherein the first wireless audio device and the second wireless audio device comprise a pair of wireless audio devices.

3. The first wireless audio device of claim 1, wherein the first positioning information and the second positioning information each includes phase information of the positioning signal.

4. The first wireless audio device of claim 1, wherein the positioning signal and the response signal are based on a Bluetooth protocol or a Bluetooth low energy (BLE) protocol.

5. The first wireless audio device of claim 1, wherein the response signal further includes information about reception strength of the positioning signal, transmission strength of the response signal, reception time of the positioning signal, or transmission time of the response signal.

6. A wireless audio device comprising:

a first wireless audio device including a first antenna, a first communication circuit connected to the first antenna, and a first processor connected to the first communication circuit, the first wireless audio device being configured to obtain first positioning information by receiving a positioning signal from an external electronic device using the first antenna;

a second wireless audio device including a second antenna, a second communication circuit connected to the second antenna, and a second processor connected to the second communication circuit, the second wireless audio device being configured to obtain second positioning information by receiving the positioning signal using the second antenna; and a case configured to accommodate the first wireless audio device and the second wireless audio device at a fixed relative position, wherein a master device among the first wireless audio device and the second wireless audio device is configured to:

identify an angle of arrival of the positioning signal based on the first positioning information, the second positioning information, and a specified antenna distance when the first wireless audio device and the second wireless audio device are accommodated in the case at the fixed relative position, and transmit a response signal including information of the identified angle of arrival to the external electronic device, wherein the specified antenna distance is based on a distance between the first antenna and the second antenna when the first wireless audio device and the second wireless audio device are accommodated in the case at the fixed relative position.

7. The wireless audio device of claim 6, wherein the master device is a specified device among the first wireless audio device and the second wireless audio device.

8. The wireless audio device of claim 6, wherein the master device is a device having highest reception strength or reception quality of the positioning signal among the first wireless audio device and the second wireless audio device.

9. The wireless audio device of claim 6, wherein the first positioning information and the second positioning information each includes phase information of the positioning signal.

10. The wireless audio device of claim 6, wherein the positioning signal and the response signal are based on a Bluetooth protocol or a Bluetooth low energy (BLE) protocol.

11. The wireless audio device of claim 6, wherein the response signal further includes information about reception strength of the positioning signal, transmission strength of the response signal, reception time of the positioning signal, or transmission time of the response signal.

12. A wireless audio device comprising:

a first wireless audio device including a first antenna, a first communication circuit connected to the first antenna, and a first processor connected to the first communication circuit;

a second wireless audio device including a second antenna, a second communication circuit connected to the second antenna, and a second processor connected to the second communication circuit; and a case including a third antenna, a third communication circuit connected to the third antenna, and a third processor connected to the third communication circuit, wherein the case is configured to accommodate the first wireless audio device and the second wireless audio device so that positions of the first wireless audio device and the second wireless audio device are fixed relative to each other and to the case, and wherein a master device of one among the first wireless audio device, the second wireless audio device, and the case is configured to:

receive a positioning signal from an external electronic device using two devices among the first wireless audio device, the second wireless audio device, and the case when the first wireless audio device and the second wireless audio device are accommodated in the case, obtain first positioning information and second positioning information based on the positioning signal received by each of the two devices, identify an angle of arrival of the positioning signal based on the first positioning information, the second positioning information, and a distance between antennas of the two devices when the first wireless audio device and the second wireless audio device are accommodated in the case, and transmit a response signal including information of the identified angle of arrival to the external electronic device.

* * * * *